(12) United States Patent
Kawai et al.

(10) Patent No.: US 11,866,094 B2
(45) Date of Patent: Jan. 9, 2024

(54) WORKING VEHICLE HAVING A DISPLAY FOR DISPLAYING DRIVING INFORMATION THEREOF

(71) Applicant: KUBOTA CORPORATION, Osaka (JP)

(72) Inventors: Misako Kawai, Sakai (JP); Kumiko Kobayashi, Sakai (JP); Yasuaki Morioka, Sakai (JP); Kunihiko Nishino, Sakai (JP); Shunsuke Miyashita, Sakai (JP); Shunsuke Edo, Sakai (JP); Manabu Togo, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 699 days.

(21) Appl. No.: 16/916,203

(22) Filed: Jun. 30, 2020

(65) Prior Publication Data
US 2020/0331529 A1  Oct. 22, 2020

Related U.S. Application Data

(63) Continuation of application No. PCT/JP2018/048082, filed on Dec. 27, 2018.

(30) Foreign Application Priority Data

Jan. 23, 2018 (JP) .................. 2018-009226
Jan. 23, 2018 (JP) .................. 2018-009227

(51) Int. Cl.
*B62D 15/02* (2006.01)
*B60K 5/00* (2006.01)
(Continued)

(52) U.S. Cl.
CPC .............. *B62D 15/025* (2013.01); *B60K 5/00* (2013.01); *B60K 35/00* (2013.01); *B62D 1/04* (2013.01);
(Continued)

(58) Field of Classification Search
CPC .......... B62D 15/025; B62D 1/04; B62D 5/04; B62D 6/00; B60K 5/00; B60K 35/00;
(Continued)

(56) References Cited

U.S. PATENT DOCUMENTS

| 5,995,023 A | 11/1999 | Kreft |
| 6,643,576 B1 * | 11/2003 | O Connor ............ G05D 1/0212 701/50 |

(Continued)

FOREIGN PATENT DOCUMENTS

| CN | 104553801 A | 4/2015 |
| JP | 2-21506 U | 2/1990 |

(Continued)

OTHER PUBLICATIONS

Espacenet English Translation of JP-2016024541-A (Year: 2016).*

(Continued)

*Primary Examiner* — James J Lee
*Assistant Examiner* — Andrew Sang Kim
(74) *Attorney, Agent, or Firm* — Keating & Bennett, LLP

(57) ABSTRACT

A working vehicle includes a steering handle, a vehicle body to travel by manual steering via the steering handle or automatic steering for the steering handle based on a scheduled traveling line, a setting switch to switch between valid and invalid, a setting mode to set at least the automatic steering before the automatic steering is started, and a display including a driving display portion to display driving information of the vehicle body during traveling. When the setting mode is switched to be valid, the display changes a displaying state of the driving display portion to another different displaying state different from the displaying state where the setting mode is invalid.

5 Claims, 37 Drawing Sheets

(51) Int. Cl.
*B60K 35/00* (2006.01)
*B62D 1/04* (2006.01)
*G01S 19/42* (2010.01)

(52) U.S. Cl.
CPC ........ *G01S 19/42* (2013.01); *B60K 2370/152* (2019.05); *B60K 2370/167* (2019.05); *B60K 2370/33* (2019.05)

(58) Field of Classification Search
CPC ........ B60K 2370/152; B60K 2370/167; B60K 2370/33; B60K 2370/1529; B60K 2370/175; B60K 2370/195; B60K 37/06; B60K 1/00; B60K 2023/0825; B60K 2370/197; B60K 17/344; B60K 23/08; G01S 19/42; B60Y 2200/211; B60Y 2200/00; B60Y 2400/301; B60R 11/02; B60R 16/02; B60R 16/005; G05D 1/02; G05D 1/0061; G05D 1/021; G05D 2201/0213
See application file for complete search history.

(56) References Cited

U.S. PATENT DOCUMENTS

| 8,467,930 | B2 * | 6/2013 | Kimura | F02D 29/02 701/1 |
|---|---|---|---|---|
| 2009/0267753 | A1 * | 10/2009 | Kim | B60K 37/02 345/30 |
| 2014/0156134 | A1 * | 6/2014 | Cullinane | B60R 22/48 701/23 |
| 2015/0109756 | A1 | 4/2015 | Choi | |
| 2017/0177002 | A1 * | 6/2017 | Ogura | A01B 69/008 |
| 2017/0274931 | A1 * | 9/2017 | Yang | B60K 35/00 |
| 2017/0371334 | A1 * | 12/2017 | Nagy | B60K 35/00 |
| 2019/0389382 | A1 * | 12/2019 | Nishii | G05D 1/0221 |

FOREIGN PATENT DOCUMENTS

| JP | 05-19690 | A | | 1/1993 | |
|---|---|---|---|---|---|
| JP | 09-504103 | A | | 4/1997 | |
| JP | 10-75626 | A | | 3/1998 | |
| JP | 2008-131880 | A | | 6/2008 | |
| JP | 2008131880 | A | * | 6/2008 | |
| JP | 2016-007195 | A | | 1/2016 | |
| JP | 2016-021893 | A | | 2/2016 | |
| JP | 2016024541 | A | * | 2/2016 | |
| JP | 2016-095658 | A | | 5/2016 | |
| JP | 2017-123803 | A | | 7/2017 | |
| JP | 2017-134471 | A | | 8/2017 | |
| JP | 2017168035 | A | * | 9/2017 | .......... G05D 1/0044 |
| JP | 2018-004307 | A | | 1/2018 | |
| WO | 2015/119265 | A1 | | 8/2015 | |
| WO | 2017/110116 | A1 | | 6/2017 | |

OTHER PUBLICATIONS

Espacenet English Translation of JP-2008131880-A (Year: 2008).*
Espacenet English Translation of JP-2017168035-A (Year: 2017).*
Black Tesla, Tesla v8.0 Autopilot—Warning Interval & Autosteer Unavailable, Sep. 24, 2016, Youtube, https://www.youtube.com/watch?v=isZ3fSbE_pg&t=322s (Year: 2016).*
Official Communication issued in corresponding Chinese Patent Application No. 201880076064.6, dated Oct. 10, 2022.
Official Communication issued in International Patent Application No. PCT/JP2018/048082, dated Apr. 2, 2019.

* cited by examiner

FIG.3A

| Number of operations | Correction amount (cm) ||
|---|---|---|
| | L-Correction amount | R-Correction amount |
| 1 | 2 | 2 |
| 2 | 4 | 4 |
| 3 | 6 | 6 |
| 4 | 8 | 8 |
| 5 | 10 | 10 |
| ⋮ | ⋮ | ⋮ |

FIG.3B

| Operation extent (Displacement) | Correction amount (cm) ||
|---|---|---|
| | L-Correction amount | R-Correction amount |
| 5mm | 2 | 2 |
| 10mm | 4 | 4 |
| 15mm | 6 | 6 |
| 20mm | 8 | 8 |
| 25mm | 10 | 10 |
| ⋮ | ⋮ | ⋮ |

WORKING VEHICLE HAVING A DISPLAY FOR DISPLAYING DRIVING INFORMATION THEREOF

CROSS REFERENCE TO RELATED APPLICATIONS

The present application is a continuation application of International Application No. PCT/JP2018/048082, filed Dec. 27, 2018, which claims the benefit of priority to Japanese Patent Application No. 2018-009226 filed on Jan. 23, 2018 and to Japanese Patent Application No. 2018-009227 filed on Jan. 23, 2018. The entire contents of each application are hereby incorporated herein by reference.

BACKGROUND OF THE INVENTION

1. Field of the Invention

The present invention relates to a working vehicle.

2. Description of the Related Art

Japanese Unexamined Patent Application Publication No. 2017-123803 is previously known as an agricultural working machine.

The agricultural working machine of Japanese Unexamined Patent Application Publication No. 2017-123803 has a traveling body capable of switching between manual traveling by manual steering and automatic traveling by automatic steering along a set traveling line that is set in parallel with a reference traveling line, and has a switch to switch between manual traveling and automatic traveling.

Further, in the agricultural working machine, after the right instruction button is pressed while traveling along the ridge, the starting point of the reference traveling line is set, and then the finishing point of the reference traveling line is set by pressing the left instruction button during the traveling. That is, the reference traveling line is set before the automatic steering.

SUMMARY OF THE INVENTION

A working vehicle includes a steering handle, a vehicle body to travel by manual steering via the steering handle or automatic steering for the steering handle based on a scheduled traveling line, a setting switch to switch, between valid and invalid, a setting mode to set at least the automatic steering before the automatic steering is started, and a display including a driving display portion to display driving information of the vehicle body during traveling. When the setting mode is switched to be valid, the display device changes a displaying state of the driving display portion to another different displaying state different from the displaying state where the setting mode is invalid.

A working vehicle includes a vehicle body to travel, a steering handle to steer the vehicle body, and a display to display a guidance screen to display at least an order to condition a traveling condition of the vehicle body.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings, described below.

FIG. 3A is an explanation view explaining a correction amount in a push switch according to a preferred embodiment of the present invention.

FIG. 3B is an explanation view explaining a correction amount in a slide switch according to a preferred embodiment of the present invention.

DETAILED DESCRIPTION OF THE PREFERRED EMBODIMENTS

Figure 1:
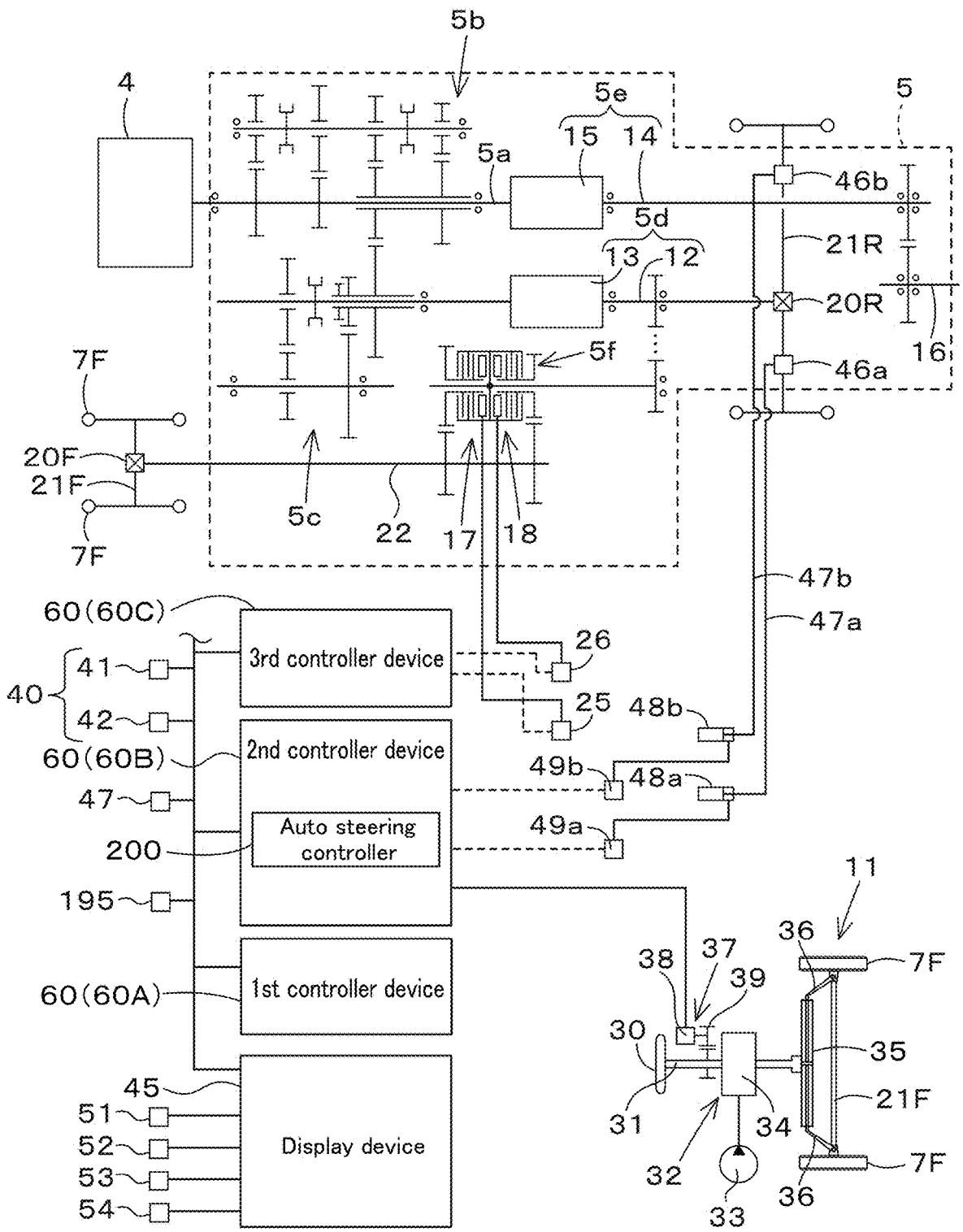
FIG. 1 is a view illustrating a configuration of a tractor and a control block diagram according to a preferred embodiment of the present invention.

The preferred embodiments of the present invention will now be described with reference to the accompanying drawings, wherein like reference numerals designate corresponding or identical elements throughout the various drawings. The drawings are to be viewed in an orientation in which the reference numerals are viewed correctly.

Hereinafter, preferred embodiments of the present invention will be described with reference to the drawings as appropriate.

FIG. 1 to FIG. 20 show preferred embodiments of the present invention.

Figure 20:
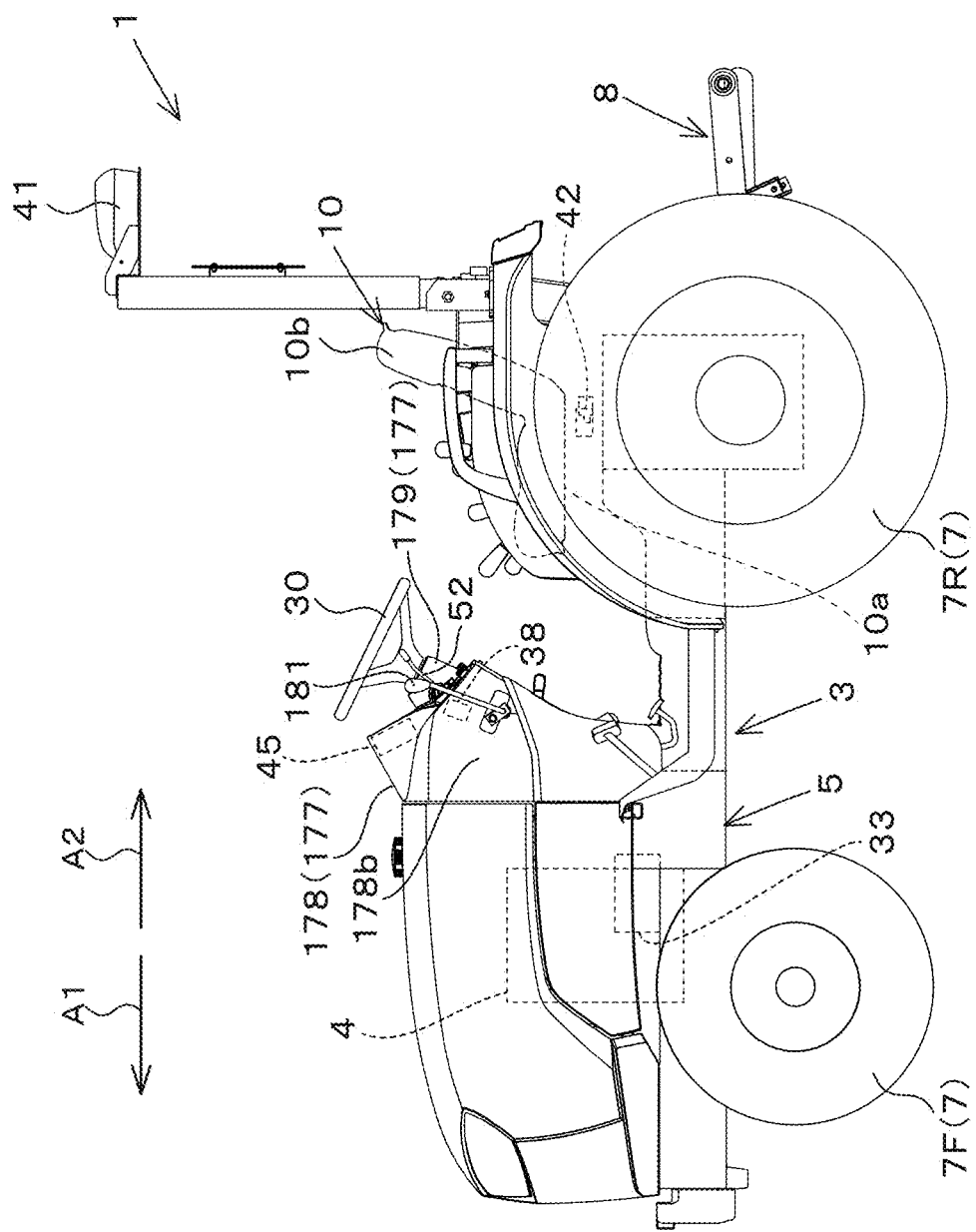
FIG. 20 is a whole view of a tractor according to a preferred embodiment of the present invention.

FIG. 20 is a side view of a working vehicle 1, and FIG. 20 is a plan view of the working vehicle 1. In this preferred embodiment, the working vehicle 1 is a tractor. However, the working vehicle 1 is not limited to the tractor, and may be an agricultural machine (an agricultural vehicle) such as a combine or transplanter, or a construction machine (a construction vehicle) such as a loader working machine.

Hereinafter, the front side of the driver sitting on the driver seat 10 of the tractor (a working vehicle) 1 (a direction indicated by an arrowed line A1 in FIG. 20) is referred to as the front, the rear side of the driver (a direction indicated by an arrowed line A2 in FIG. 20) is referred to as the rear, the left side of the driver (a direction indicated by an arrowed line B1 in FIG. 20) is referred to as the left, and the right side of the driver (a direction indicated by an arrowed line B2 in FIG. 20) is referred to as the right. In addition, a horizontal direction (a direction indicated by an arrowed line B3 in FIG. 20), which is a direction orthogonal to the front-rear direction of the working vehicle 1, will be described as a vehicle width direction.

As shown in FIG. 20, the tractor 1 includes a vehicle body 3, a prime mover 4, and a transmission device 5. The vehicle body 3 includes a traveling device 7 and is configured to travel. The traveling device 7 includes front wheels 7F and rear wheels 7R. The front wheel 7F may be a tire type or a crawler type. In addition, the rear wheel 7R may also be a tire type or a crawler type.

The prime mover 4 is a diesel engine, an electric motor, or the like, and is a diesel engine in this preferred embodiment. The transmission device 5 is capable of switching the propulsive force of the traveling device 7 by gear shifting, and is also capable of switching the traveling device 7 between the forward traveling and the reverse traveling. The vehicle body 3 is provided with a driver seat 10.

In addition, at the rear portion of the vehicle body 3, there is provided a connector portion 8 including a three-point link mechanism or the like. A working device can be attached to and detached from the connector portion 8. By connecting the working device to the connector portion 8, the working device can be pulled by the vehicle body 3. The working device is a tilling device for cultivating, a fertilizer sprayer device for spraying fertilizer, a pesticide sprayer device for spraying pesticides, a harvester device for harvesting, a mower device for cutting grass and the like, a tedder device for tedding grass and the like, and a baler device for molding grass and the like.

As shown in FIG. 1, the transmission device 5 includes a main shaft (a propulsion shaft) 5a, a main transmission portion 5b, an auxiliary transmission portion 5c, a shuttle portion 5d, a PTO power transmission portion 5e, and a front transmission portion 5f. The propulsion shaft 5a is rotatably supported by a housing case (a transmission case) of the transmission device 5, and the power from a crankshaft of a prime mover (an engine) 4 is transmitted to the propulsion shaft 5a. The main transmission portion 5b includes a plurality of gears and a shifter that changes the engagement of the gears. The main transmission portion 5b changes the rotation inputted from the propulsion shaft 5a, and outputs (shifts) the rotation by appropriately changing the connection (engagement) of the plurality of gears with a shifter.

The sub-transmission portion 5c includes a plurality of gears and a shifter to change the engagement of the gears, similar to the main transmission portion 5b. The sub-transmission portion 5c changes the rotation inputted from the main transmission portion 5b, and outputs (shifts) the rotation by appropriately changing the connection (engagement) of a plurality of gears with a shifter.

The shuttle portion 5d includes a shuttle shaft 12 and a forward/reverse traveling switch portion 13. The power outputted from the auxiliary transmission portion 5c is transmitted to the shuttle shaft 12 through gears and the like. The forward/reverse traveling switch portion 13 includes, for example, a hydraulic clutch or the like, and switches the rotational direction of the shuttle shaft 12, that is, switches the forward and backward movements of the tractor 1 by engaging and disengaging the hydraulic clutch. The shuttle shaft 12 is connected to the rear wheel differential device 20R. The rear wheel differential device 20R rotatably supports a rear axle 21R to which the rear wheel 7R is attached.

The PTO power transmission portion 5e includes a PTO propulsion shaft 14 and a PTO clutch 15. The PTO propulsion shaft 14 is rotatably supported and is configured to transmit the power from the propulsion shaft 5a. The PTO propulsion shaft 14 is connected to the PTO shaft 16 through a gear or the like. The PTO clutch 15 includes, for example, a hydraulic clutch or the like, and when the hydraulic clutch is engaged or disengaged, the power of the propulsion shaft 5a is transmitted to the PTO propulsion shaft 14 and the power of the propulsion shaft 5a is not transmitted to the PTO propulsion shaft 14.

The front transmission portion 5f includes a first clutch 17 and a second clutch 18. The power from the propulsion shaft 5a can be transmitted to the first clutch 17 and the second clutch, and for example, the power of the shuttle shaft 12 is transmitted through the gear and the transmission shaft. The power from the first clutch 17 and the second clutch 18 can be transmitted to the front axle 21F through the front transmission shaft 22. In particular, the front transmission shaft 22 is connected to the front wheel differential device 20F, and the front wheel differential device 20F rotatably supports the front axle 21F to which the front wheels 7F are attached.

The first clutch 17 and the second clutch 18 are hydraulic clutches and the like. A fluid tube is connected to the first clutch 17, and the fluid tube is connected to a first operation valve 25 to which hydraulic fluid outputted from a hydraulic pump is supplied. The first clutch 17 switches between a engaging state and a disengaging state depending on the opening degree of the first operation valve 25. A fluid tube is connected to the second clutch 18, and the second operation valve 26 is connected to the fluid tube. The second clutch 18 switches between an engaging state and a disengaging state depending on the opening degree of the second operation valve 26. The first operation valve 25 and the second operation valve 26 are, for example, two-position switching valves with an electromagnetic valve, and are switched to an engaging state or to a disengaging state by magnetizing or demagnetizing the solenoid of the electromagnetic valve.

When the first clutch 17 is in the disengaging state and the second clutch 18 is in the engaging state, the power of the shuttle shaft 12 is transmitted to the front wheels 7F through the second clutch 18. In this manner, four-wheel drive (4WD) in which the front wheels and the rear wheels are driven by power, and the rotational speeds of the front wheels and the rear wheels become substantially the same (4WD constant speed state). On the other hand, when the first clutch 17 is in the engaging state and the second clutch 18 is in the disengaging state, the four-wheel drive is performed and the rotational speed of the front wheels becomes faster than the rotational speed of the rear wheels (4WD acceleration state). In addition, when the first clutch 17 and the second clutch 18 are in the disengaging state, the power of the shuttle shaft 12 is not transmitted to the front wheels 7F, so that the rear wheels are driven by two wheels (2WD).

The tractor 1 includes a position detector device 40 (also referred to as a positioning device). The position detector device 40 is configured to detect its own position (the positioning information including latitude and longitude) by a satellite positioning system (a positioning satellite) such as the D-GPS, the GPS, the GLONASS, the Hokuto, the Galileo, and the Michibiki. That is, the position detector device 40 receives a received signal (a position of the positioning satellite, a transmission time, correction information, and the like) transmitted from the positioning satellite, and the position (for example, latitude and longitude) is detected based on the received signal (also referred to as satellite signal). The position detector device 40 includes a receiver device 41 and an inertial measurement device (IMU: Inertial measurement device) 42. The receiver device 41 includes an antenna or the like and receives a received signal transmitted from a positioning satellite, and is attached to the vehicle body separately from the inertia measurement device 42. In this preferred embodiment, the receiver device 41 is attached to a rope provided on the vehicle body 3. Note that the attachment location of the receiver device 41 is not limited to the present preferred embodiment.

The inertia measurement device 42 includes an acceleration sensor that detects acceleration, a gyro sensor that detects angular velocity, and the like. The roll angle, pitch angle, yaw angle, and the like of the vehicle body 3 can be detected by the inertia measurement device 42 provided below the vehicle body 3, for example, the driver seat 10.

As shown in FIG. 1, the tractor 1 includes a steering device 11. The steering device 11 is configured to perform the manual steering to steer the vehicle body 3 through a driver's operation and to perform the automatic steering to automatically steer the vehicle body 3 without the driver's operation.

The steering device 11 includes a steering handle (steering wheel) 30 and a steering shaft (rotating shaft) 31 that rotatably supports the steering handle 30. The steering device 11 also includes an auxiliary mechanism (a power steering device) 32. The auxiliary mechanism 32 assists the rotation of the steering shaft 31 (a steering handle 30) by hydraulic pressure or the like. The auxiliary mechanism 32 includes a hydraulic pump 33, a control valve 34 to which the hydraulic fluid discharged from the hydraulic pump 33 is supplied, and includes the steering cylinder 35 to be operated by the control valve 34. The control valve 34 is, for example, a three-position switching valve that can be switched by moving a spool or the like, and switches according to the steering direction (a rotational direction) of the steering shaft 31. The steering cylinder 35 is connected to an arm (a knuckle arm) 36 that changes the direction of the front wheels 7F.

Thus, when the driver grips the steering wheel 30 and operates the steering in one direction or in the other direction, the switching position and the opening degree of the control valve are switched according to the rotational direction of the steering wheel 30, and then the control valve 34 is switched. The steering direction of the front wheels 7F can be changed by stretching and shortening the steering cylinder 35 leftward or rightward in accordance with the switching position and the opening degree. That is, the vehicle body 3 can change the traveling direction to the left or to the right by manually steering the steering handle 30.

Next, the automatic steering will be described below.

Figure 2:
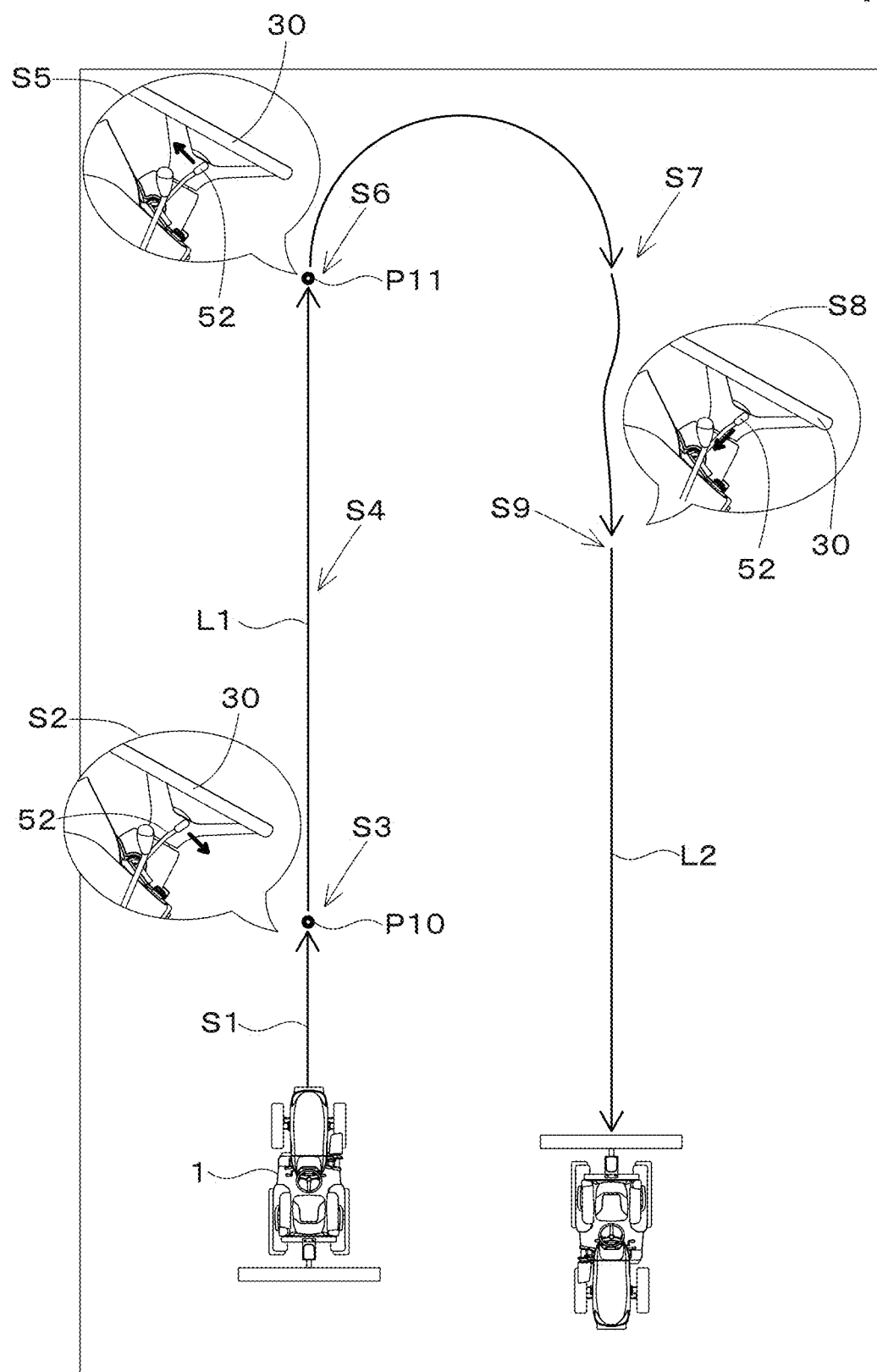
FIG. 2 is an explanation view explaining an automatic steering according to a preferred embodiment of the present invention.

As shown in FIG. 2, when performing the automatic steering, the reference traveling line L1 is set first before performing the automatic steering. After setting the reference traveling line L1, the automatic steering can be performed by setting the scheduled traveling line L2 parallel to the reference traveling line L1. In the automatic steering, steering of the tractor 1 (the vehicle body 3) in the traveling direction is automatically performed so that the vehicle body position measured by the position detector device 40 and the scheduled traveling line L2 match each other.

In particular, before performing the automatic steering, the tractor 1 (the vehicle body 3) is moved to a predetermined position in the agricultural field (step S1), and when the driver operates the steering switch 52 provided on the tractor 1 at the predetermined position (step S2), the vehicle body position measured by the position detector device 40 is set to the starting point P10 of the reference traveling line L1 (step S3). In addition, when the tractor 1 (the vehicle body 3) is moved from the starting point P10 of the reference traveling line L1 (step S4) and the driver operates the steering switch 52 at a predetermined position (step S5), the vehicle body position measured by the position detector device 40 is set to the finishing point P11 of the reference traveling line L1 (step S6). Thus, the straight line connecting the starting point P10 and the finishing point P11 is set as the reference traveling line L1.

After setting the reference traveling line L1 (after step S6), for example, when the tractor 1 (the vehicle body 3) is moved to a place different from the place where the reference traveling line L1 is set (step S7) and when the driver operates the steering switch 52 (step S8), the scheduled travel line L2, which is a straight line parallel to the reference traveling line L1, is set (step S9). After setting the scheduled traveling line L2, the automatic steering is started, and the traveling direction of the tractor 1 (the vehicle body 3) is changed to follow the scheduled traveling line L2. For example, when the current vehicle body position is on the left side of the scheduled traveling line L2, the front wheels 7F are steered to the right, and when the current vehicle body position is on the right side of the scheduled traveling line L2, the front wheels 7F is steered to the left. During the automatic steering, the driver can manually change the traveling speed (the vehicle speed) of the tractor 1 (the vehicle body 3) by changing the operation amount of the accelerator member (accelerator pedal, accelerator lever) provided on the tractor 1 or can be changed by changing the gear position of the transmission device.

In addition, after the automatic steering is started, the driver can operate the steering switch 52 at an arbitrary position to end the automatic steering. That is, the finishing point of the scheduled traveling line L2 can be set by the finishing of the automatic steering through the operation of the steering switch 52. That is, the length from the starting point to the finishing point of the scheduled traveling line L2 can be set longer or shorter than the reference traveling line L1. In other words, the scheduled traveling line L2 is not associated with the length of the reference traveling line L1, and the scheduled traveling line L2 allows the vehicle to travel while automatically steering a distance longer than the length of the reference traveling line L1.

As shown in FIG. 1, the steering device 11 includes an automatic steering mechanism 37. The automatic steering mechanism 37 is configured to automatically steer the vehicle body 3 and to automatically steer the vehicle body 3 based on the position of the vehicle body 3 (the vehicle body position) detected by the position detector device 40. The automatic steering mechanism 37 includes a steering motor 38 and a gear mechanism 39. The steering motor 38 is a motor whose rotational direction, rotational speed, rotational angle, and the like can be controlled based on the vehicle body position. The gear mechanism 39 includes a gear that is provided on the steering shaft 31 and rotates together with the steering shaft 31, and a gear that is provided on the rotation shaft of the steering motor 38 and rotates together with the rotation shaft. When the rotation shaft of the steering motor 38 rotates, the steering shaft 31 automatically rotates (turns) through the gear mechanism 39, and the steering direction of the front wheels 7F can be changed so that the vehicle body position coincides with the scheduled traveling line L2.

As shown in FIG. 1 and FIG. 20, the tractor 1 includes a display device 45. The display device 45 is configured to display various information regarding the tractor 1, and configured to display at least operation information of the tractor 1. The display device 45 is provided in front of the driver seat 10.

As shown in FIG. 1, the tractor 1 includes a setting switch 51. The setting switch 51 is a switch that switches to a setting mode in which setting is performed at least before the start of automatic steering. The setting mode is a mode in which various settings relating to the automatic steering are performed before the automatic steering is started, and for example, a starting point and an finishing point of the reference traveling line L1 are set.

The setting switch 51 can be switched to ON or OFF. When being ON, the setting switch 51 outputs a signal indicating that the setting mode is valid, and when being OFF, the setting switch 51 outputs a signal indicating that the setting mode is invalid. The setting switch 51 outputs a signal indicating that the setting mode is valid to the display device 45 when the setting switch 51 is ON, and outputs a signal indicating that the setting mode is invalid to the display device 45 when the setting switch 51 is OFF.

The tractor 1 includes a steering switch 52. The steering switch 52 is a switch configured to change between the starting and the ending of the automatic steering. In particular, the steering switch 52 is capable of switching upward, downward, forward, and backward from the neutral position, and when the setting mode is valid. When the downward switching is performed from the neutral position, the automatic steering is started, and when the upward switching is performed from the neutral position, the automatic steering is finished. In addition, the steering switch 52 outputs that the current vehicle body position is set to the starting point P10 of the reference traveling line L1 when the setting mode is valid and is changed over from the neutral position, and the steering switch 52 outputs setting that the current vehicle body position is set to the finishing point P11 of the reference traveling line L1 when the steering switch 52 is switched forward from the neutral position while the setting mode is valid.

The tractor 1 includes a correction switch 53. The correction switch 53 corrects the vehicle body position (latitude, longitude) measured by the position detector device 40. That is, the correction switch 53 corrects the vehicle body position (referred to as a calculated vehicle body position) calculated using the received signal (positioning satellite position, transmission time, correction information, and the like) and the measurement information (acceleration, angular velocity) measured by the inertia measurement device 42.

The correction switch 53 includes a push switch that can be pressed or a slide switch that can be slid. The case where the correction switch 53 is a push switch or a slide switch will be described below.

When the correction switch 53 is a push switch, the correction amount is set based on the number of times the push switch is operated. The correction amount is determined by a correction amount=number of operations×correction amount per a single operation (a correction amount per unit). For example, as shown in FIG. 3A, the correction amount increases by several centimeters or tens of centimeters each time the push switch is operated. The number of push switch operations is inputted to the first controller 60A, and the first controller 60A sets (calculates) the correction amount based on the number of operations. The first control device 60A can change a predetermined operation of the push switch, that is, a correction amount per one operation.

When the correction switch 53 is a slide switch, the correction amount is set based on the operation amount (displacement amount) of the slide switch. For example, the correction amount is determined by the correction amount=the amount of displacement from the predetermined position. For example, as shown in FIG. 3B, the correction amount increases by several centimeters or tens of centimeters each time the displacement amount of the slide switch increases by 5 mm. The operation amount (a displacement amount) of the slide switch is inputted to the first control device 60A, and the first control device 60A sets (calculates) the correction amount based on the displacement amount. Even if the correction switch 53 is a slide switch, the correction amount can be changed in the same manner as the push switch. In addition, the above-described correction amount increasing method and increase ratio are not limited to the above-described numerical values.

Figure 4A:
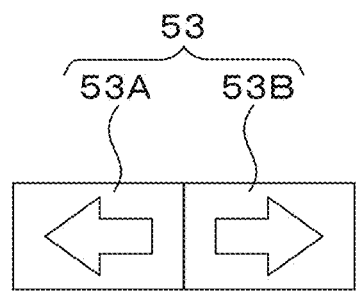
FIG. 4A is a view illustrating a first corrector portion and a second corrector portion in a push switch according to a preferred embodiment of the present invention.
Figure 4B:
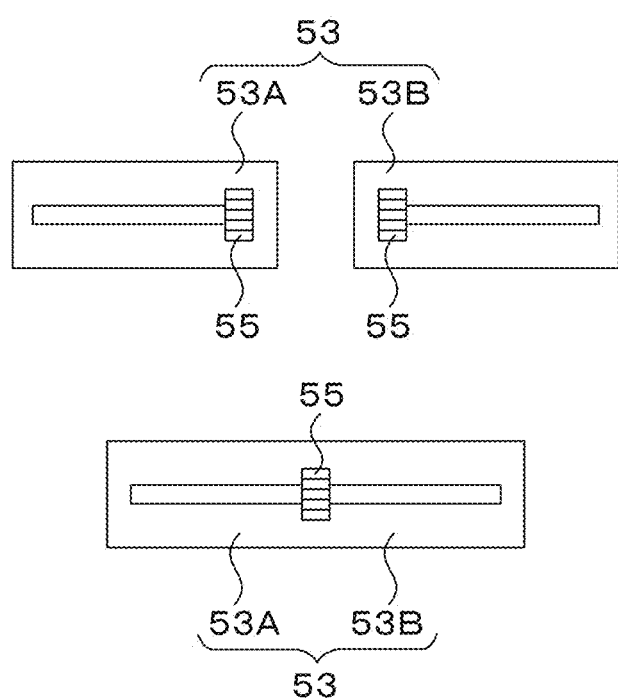
FIG. 4B is a view illustrating a first corrector portion and a second corrector portion in a slide switch according to a preferred embodiment of the present invention.

In particular, as shown in FIGS. 4A and 4B, the correction switch 53 includes a first corrector portion 53A and a second corrector portion 53B. The first corrector portion 53A is a portion that commands the correction of the vehicle body position corresponding to one side in the width direction of the vehicle body 3, that is, the left side. The second corrector portion 53B is a portion that commands the correction of the vehicle body position corresponding to the other side in the width direction of the vehicle body 3, that is, the right side.

As shown in FIG. 4A, when the correction switch 53 is a push switch, the first corrector portion 53A and the second corrector portion 53B are ON or OFF switches that automatically return each time the operation is performed. The switch of the first corrector portion 53A and the switch of the second corrector portion 53B are integrated. The switch of the first corrector portion 53A and the switch of the second corrector portion 53B may be arranged separately from each other. As shown in FIG. 3A, each time the first corrector portion 53A is pressed, the correction amount (the left correction amount) corresponding to the left side of the vehicle body 3 increases. In addition, every time the second corrector portion 53B is pressed, the correction amount (the right correction amount) corresponding to the right side of the vehicle body 3 increases.

As shown in FIG. 4B, when the correction switch 53 is a slide switch, the first corrector portion 53A and the second corrector portion 53B include a knob 55 that moves left or right along the longitudinal direction of the long hole. When the correction switch 53 is a slide switch, the first corrector portion 53A and the second corrector portion 53B are arranged apart from each other in the width direction. As shown in FIG. 3B, when the knob 55 is gradually displaced from the predetermined reference position to the left, the left correction amount increases in accordance with the displacement amount. In addition, when the knob 55 is gradually displaced to the right from the predetermined reference position, the right correction amount increases according to the displacement amount. As shown in FIG. 4B, in the case of a slide switch, the first correction portion 53A and the second correction portion 53B are integrally formed, and the reference position of the knob portion 55 is set to the central portion. The left correction amount may be set when moving to the left side, and the right correction amount may be set when moving the knob 55 from the intermediate position to the right side.

Next, the relation between the correction amount (left correction amount, right correction amount) by the correction switch 53, the scheduled traveling line L2, and the behavior of the tractor 1 (vehicle body 3) (a traveling locus) will be described.

Figure 5A:
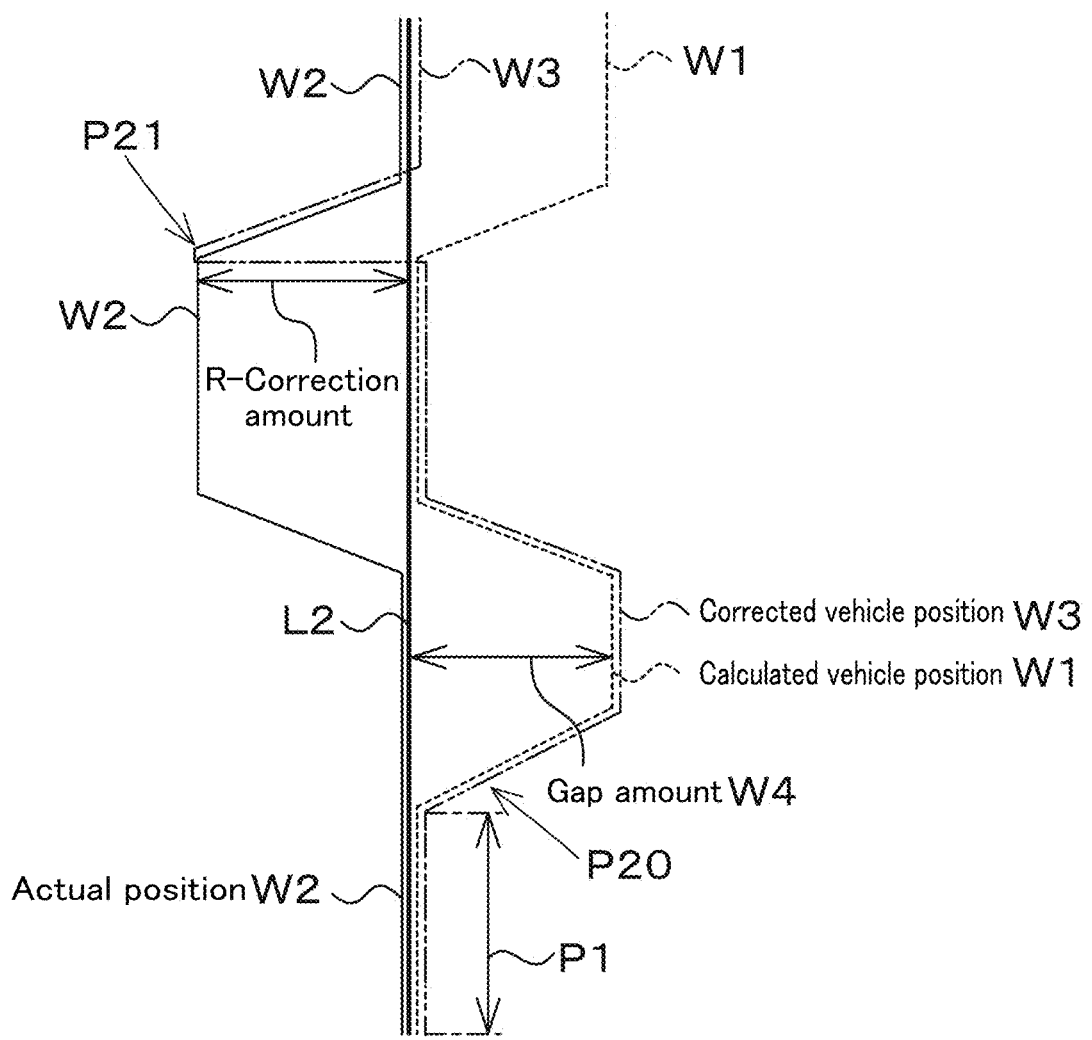
FIG. 5A is a view illustrating a state where a calculated vehicle body position deviates to the right during straight traveling in an automatic steering according to a preferred embodiment of the present invention.

FIG. 5A shows a state in which the calculated vehicle body position W1 deviates to the right while the vehicle is traveling straight ahead during the automatic steering. As shown in FIG. 5A, in the state where the automatic steering is started, the actual position (actual position W2) of the tractor 1 (vehicle body 3) and the calculated vehicle body position W1 match each other, and when the actual position W2 and the scheduled traveling line L2 match each other, the tractor 1 travels along the scheduled traveling line L2. That is, in the section P1 where there is no error in the positioning of the position detector device 40 and the vehicle body position (calculated vehicle body position W1) detected by the position detector device 40 is the same as the actual position W2, the tractor 1 travels along the scheduled traveling line L2. When the positioning of the position detector device 40 has no error and no correction is performed, the calculated vehicle body position W1 and the corrected vehicle body position corrected by the correction amount (corrected vehicle body position) W3 have the same value. The corrected vehicle body position W3 is the corrected vehicle body position W3=calculated vehicle body position W1−correction amount.

Here, in the vicinity of the position P20, although the actual position W2 does not deviate from the scheduled traveling line L2, due to various influences, an error occurs in the positioning of the position detector device 40, and the position detector device 40 causes an error. When the detected vehicle body position deviates to the right with respect to the scheduled traveling line L2 (actual position W2) and the deviation amount W4 is maintained, the tractor 1 determines that there causes deviation between the calculated vehicle body position W1 and the scheduled traveling line L2, and the tractor 1 is steered to the left so as to eliminate the deviation amount W4 between the calculated vehicle body position W1 and the scheduled traveling line L2. Then, the actual position W2 of the tractor 1 is shifted to the scheduled traveling line L2 by steering to the left. Then, it is assumed that the driver notices that the tractor 1 is displaced from the scheduled traveling line L2 and steers the second corrector portion 53B at the position P21 to increase the right correction amount from zero. The right correction amount is added to the calculated vehicle body position W1, and the corrected vehicle body position (corrected vehicle body position) W3 can be made substantially the same as the actual position W2. That is, by setting the right correction amount by the second corrector portion 53B, it is possible to correct the vehicle body position of the position detector device 40 in a direction to eliminate the deviation amount W4 that has occurred near the position P20. As shown in the position P21 of FIG. 5A, when the actual position W2 of the tractor 1 is separated from the scheduled traveling line L2 on the left side after the vehicle body position is corrected, the tractor 1 is steered to the right and the tractor 1 is moved. The actual position W2 can be matched with the scheduled traveling line L2.

Figure 5B:
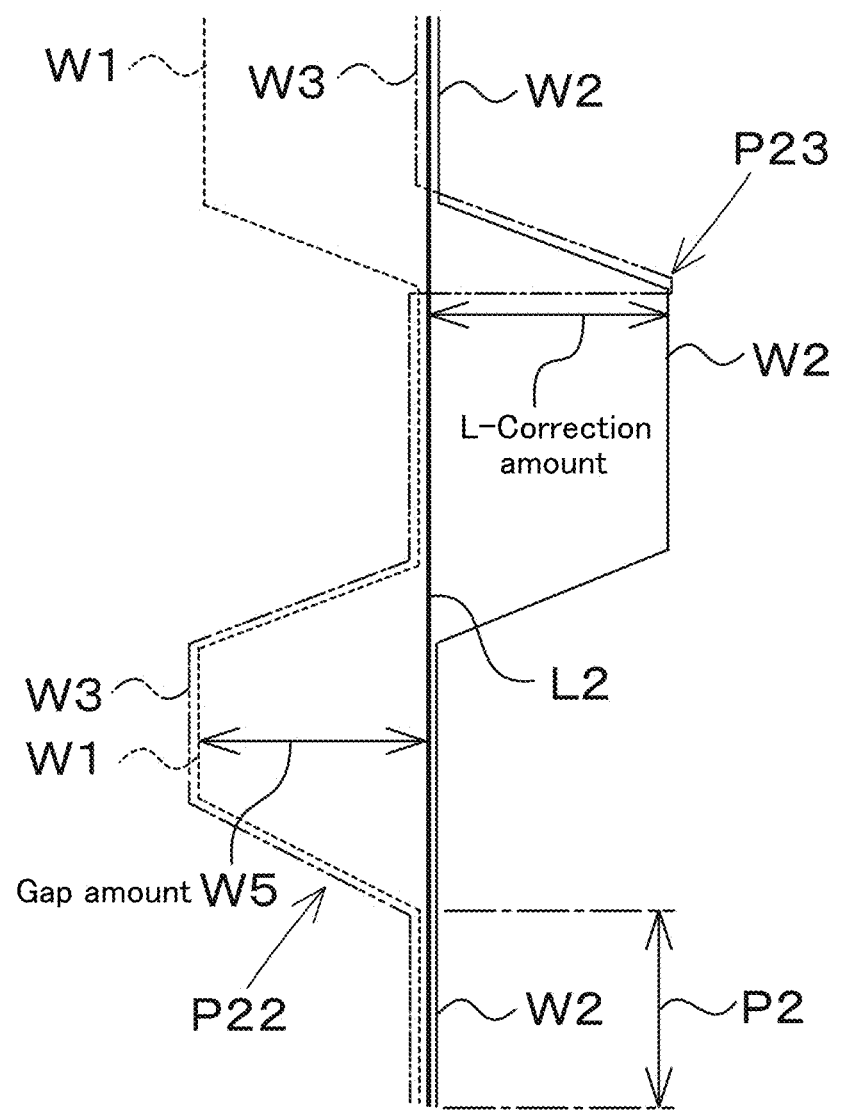
FIG. 5B is a view illustrating a state where the calculated vehicle body position deviates to the left during straight traveling in an automatic steering according to a preferred embodiment of the present invention.

FIG. 5B shows a state in which the calculated vehicle body position W1 deviates to the left while the vehicle is traveling straight ahead during the automatic steering. As shown in FIG. 5B, when the actual position W2 and the calculated vehicle body position W1 coincide with each other and the actual position W2 and the scheduled traveling line L2 coincide with each other in the state where the automatic steering is started, the state shown in FIG. 5A. Similarly, the tractor 1 travels along the scheduled traveling line L2. That is, similarly to FIG. 5A, the tractor 1 travels along the scheduled traveling line L2 in the section P2 where the positioning of the position detector device 40 has no error. In addition, as in FIG. 5A, the calculated vehicle body position W1 and the corrected vehicle body position W3 have the same value.

Here, due to various influences at the position P22, an error occurs in the positioning of the position detector device 40, and the vehicle body position W1 detected by the position detector device 40 deviates to the left with respect to the actual position W2, resulting in a deviation amount W5. When the deviation amount W5 is maintained, the tractor 1 steers the tractor 1 to the right so as to eliminate the deviation amount W5 between the calculated vehicle body position W1 and the scheduled traveling line L2. Then, it is assumed that the driver notices that the tractor 1 is displaced from the scheduled traveling line L2, and the driver steers the first corrector portion 53A at the position P23 to increase the left correction amount from zero. Then, the left correction amount is added to the calculated vehicle body position W1, and the corrected vehicle body position (corrected vehicle body position) W3 can be made substantially the same as the actual position W2. That is, by setting the left correction amount by the first corrector portion 53A, it is possible to correct the vehicle body position of the position detector device 40 in a direction to eliminate the deviation amount W5 that has occurred in the vicinity of the position P22. As shown in the position P23 of FIG. 5B, when the actual position W2 of the tractor 1 is separated away from the scheduled traveling line L2 to the right after the vehicle body position is corrected, the tractor 1 is steered to the left and the tractor 1 is moved to the left. The actual position W2 can be matched with the scheduled traveling line L2.

That is, by operating the correction switch 53, the steering can be performed separately from the steering wheel 30. That is, the correction switch 53 is also a steering member that steers the vehicle body 3.

Next, the setting switch 51, the correction switch 53, and the screen switch 54 will be described.

Figure 18:
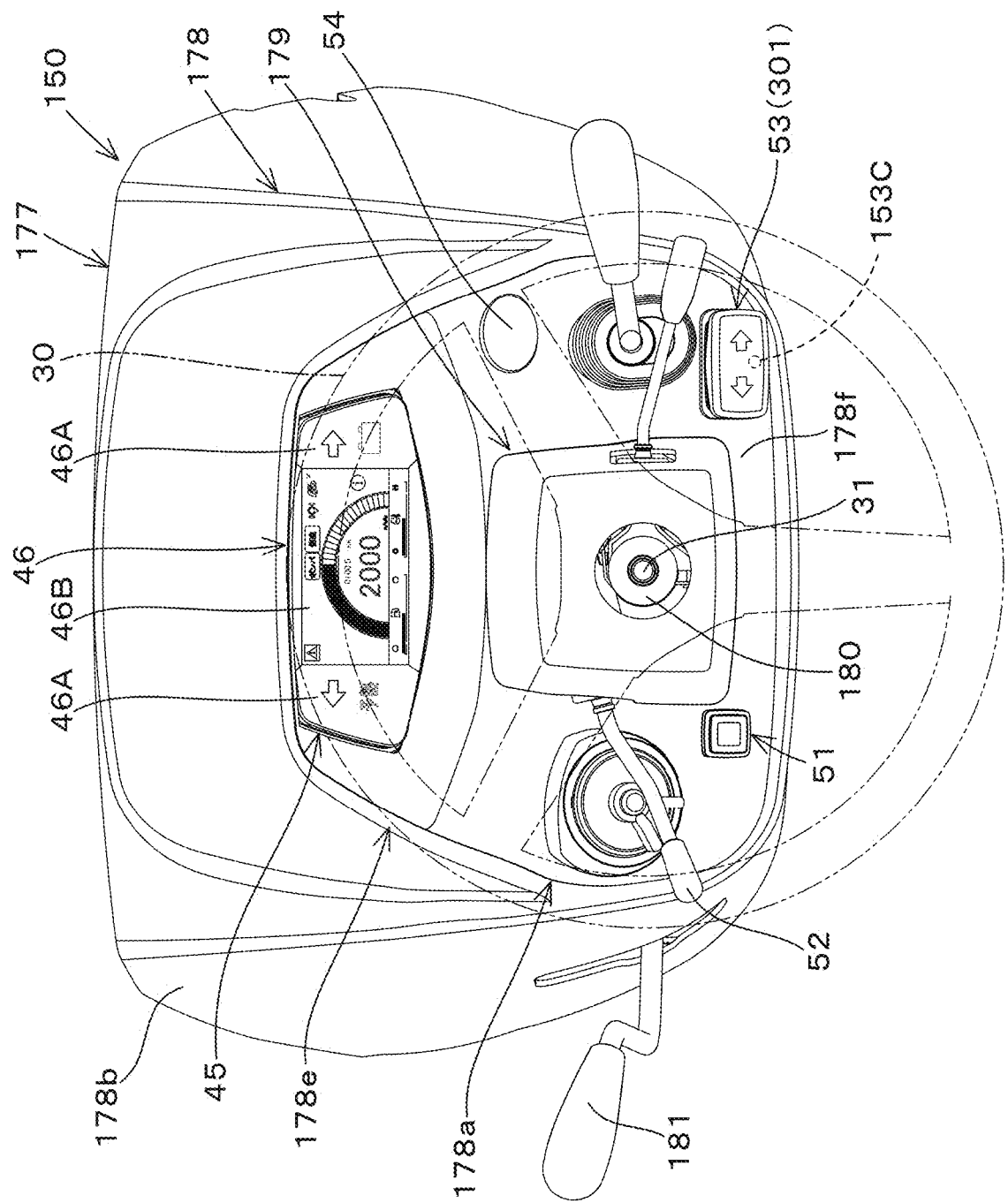
FIG. 18 is a view illustrating a cover positioned in front of the driver seat, which is seen from the driver seat side, according to a preferred embodiment of the present invention.

As shown in FIG. 18, an operation console 150 is provided in front of the driver seat 10. The operation console 150 is a platform that supports at least an operation member that performs an operation, and a correction switch 53 that is one of the operation members is attached to the operation console 150. The setting switch 51 and the steering switch 52 are attached to the operation console 150.

The operation console 150 supports a steering handle 30, that is, a steering shaft (rotating shaft) 31 that rotatably supports the steering handle 30. The outer circumference of the steering shaft 31 is covered with a steering post 180. The outer periphery of the steering post 180 is covered with a cover 177. That is, the operation console 150 includes a cover 177 that covers the steering shaft (rotating shaft) 31. The cover 177 is provided in front of the driver seat 10. The cover 177 includes a panel cover 178 and a column cover 179.

The panel cover 178 supports the display device 45. A support portion 178e that supports the display device 45 is provided on the upper plate portion 178a of the panel cover 178. The support portion 178e supports the display device 45 in front of the steering shaft 31 and below the steering handle 30. In addition, the upper plate portion 178a includes a mounting surface 178f to which the setting switch 51, the correction switch 53, and the screen switch 54 are mounted. The mounting surface 178f is provided behind the support portion 178e and below the steering handle 30. The support portion 178e and the mounting surface 178f are continuous, the support portion 178e is located in the front portion of the upper plate portion 178a, and the mounting surface 178f is located in the rear portion of the upper plate portion 178a. The setting switch 51, the correction switch 53, and the screen switch 54 are attached to the attachment surface 178f. As the result, the setting switch 51, the correction switch 53, and the screen switch 54 are arranged around the steering shaft 31.

A shuttle lever 181 projects from the left plate portion 178b of the panel cover 178. The shuttle lever 181 performs an operation of switching the traveling direction of the vehicle body 3. More specifically, by operating (swinging) the shuttle lever 181 forward, the forward/reverse traveling switch portion 13 is in a state of outputting forward power to the traveling device 7, and the traveling direction of the vehicle body 3 is switched to the forward direction. In addition, by operating (swinging) the shuttle lever 181 backward, the forward/reverse traveling switch portion 13 is in a state of outputting the backward power to the traveling device 7, and the traveling direction of the vehicle body 3 is switched to the backward direction. When the shuttle lever 181 is in the neutral position, no power is output to the traveling device 7.

The column cover 179 is arranged below the steering handle 30 and covers the periphery of the upper portion of the steering shaft 31. The column cover 179 preferably has a substantially rectangular tube shape, and projects upward from the mounting surface 178f of the panel cover 178. That is, the mounting surface 178f is provided around the column cover 179. Thus, the setting switch 51, the correction switch 53, and the screen switch 54 attached to the attachment surface 178f are arranged around the column cover 179.

Next, the respective arrangements of the setting switch 51, the steering switch 52, the correction switch 53, and the screen switch 54 will be described in detail. As shown in FIG. 18, the setting switch 51, the steering switch 52, the correction switch 53, and the screen switch 54 are arranged around the steering shaft 31.

The setting switch 51 is arranged on one side (left side) of the steering shaft 31. The steering switch 52 is arranged on one side (left side) of the steering shaft 31. In the case of the present preferred embodiment, the steering switch 52 includes a swingable lever. The steering switch 52 is swingable with a base end portion provided on the steering shaft 31 side as a fulcrum. The base end of the steering switch 52 is provided inside the column cover 179. The steering switch 52 projects to one side (left side) of the column cover 179.

The correction switch 53 is arranged on the other side (right side) of the steering shaft 31. More specifically, the correction switch 53 is arranged on the right side and the rear side (obliquely right rear side) of the steering shaft 31. The correction switch 53 is arranged to the right of and behind the column cover 179 (obliquely to the right rear) in the positional relation with the column cover 179. The correction switch 53 is arranged on the right rear portion of the mounting surface 178f in the positional relation with the mounting surface 178f of the panel cover 178. Since the correction switch 53 is arranged at the rear of the inclined mounting surface 178f, a long distance can be secured between the correction switch 53 and the steering wheel 30. As the result, it is possible to more reliably prevent unintended operation of the correction switch 53 and unintended steering of the steering wheel 30.

The screen switch 54 is arranged on the other side (right side) of the steering shaft 31. More specifically, the screen switch 54 is arranged to the right of and in front of the steering shaft 31 (obliquely right front). The screen switch 54 is arranged to the right and front (obliquely right front) of the column cover 179 in the positional relation with the column cover 179. The screen switch 54 is arranged on the right front portion of the mounting surface 178f in the positional relation with the mounting surface 178f of the panel cover 178. The screen switch 54 is arranged in front of the correction switch 53.

As described above, the setting switch 51, the steering switch 52, the correction switch 53, and the screen switch 54 are arranged around the steering shaft 31. In other words, the setting switch 51, the steering switch 52, the correction switch 53, and the screen switch 54 are collectively present around the steering shaft 31. Thus, the driver can clearly understand the position of each switch. In addition, the driver can operate each switch without changing the posture while sitting in the driver seat 10. Thus, the operability is good and erroneous operation can be prevented. In addition, the harness (wiring) routed from each switch can be shortened.

Regarding the arrangement of the above-mentioned switches, the left and the right may be replaced with each other. That is, one side may be the left side and the other side may be the right side, or one side may be the right side and the other side may be the left side. In particular, for example, the setting switch 51 and the steering switch 52 may be arranged on the right side of the steering shaft 31, and the correction switch 53 may be arranged on the left side of the steering shaft 31.

As shown in FIG. 1, the tractor 1 includes a plurality of control devices 60. The plurality of control devices 60 are devices that control the traveling system, the work system, the vehicle body position, and the like in the tractor 1. The plurality of control devices 60 include a first control device 60A, a second control device 60B, and a third control device 60C.

The first control device 60A receives the received signal (received information) received by the receiver device 41 and the measurement information (acceleration, angular velocity, and the like) measured by the inertia measurement device 42, and calculates the vehicle position based on the received information and the measurement information, the vehicle body position. For example, when the correction amount by the correction switch 53 is zero, that is, when correction of the vehicle body position by the correction switch 53 is not instructed, the first control device 60A calculates the calculated vehicle body based on the received information and the measurement information. The calculated vehicle body position W1 is determined as the vehicle body position to be used during the automatic steering without correcting the position W1. On the other hand, when the correction switch 53 is instructed to correct the vehicle body position, the first control device 60A determines the vehicle body position based on either the number of times the correction switch 53 is operated or the operation amount (displacement amount) of the correction switch 53. The correction amount is set, and the corrected vehicle body position W3 obtained by correcting the calculated vehicle body position W1 by the correction amount is determined as the vehicle body position used during the automatic steering.

The first control device 60A sets a control signal based on the vehicle body position (calculated vehicle body position W1, corrected vehicle body position W3) and the scheduled traveling line L2, and outputs the control signal to the second controller 60B.

The second control device 60B controls the steering motor 38 of the automatic steering mechanism 37 so that the vehicle body 3 travels along the scheduled traveling line L2 based on the control signal outputted from the first control device 60A.

Figure 17:
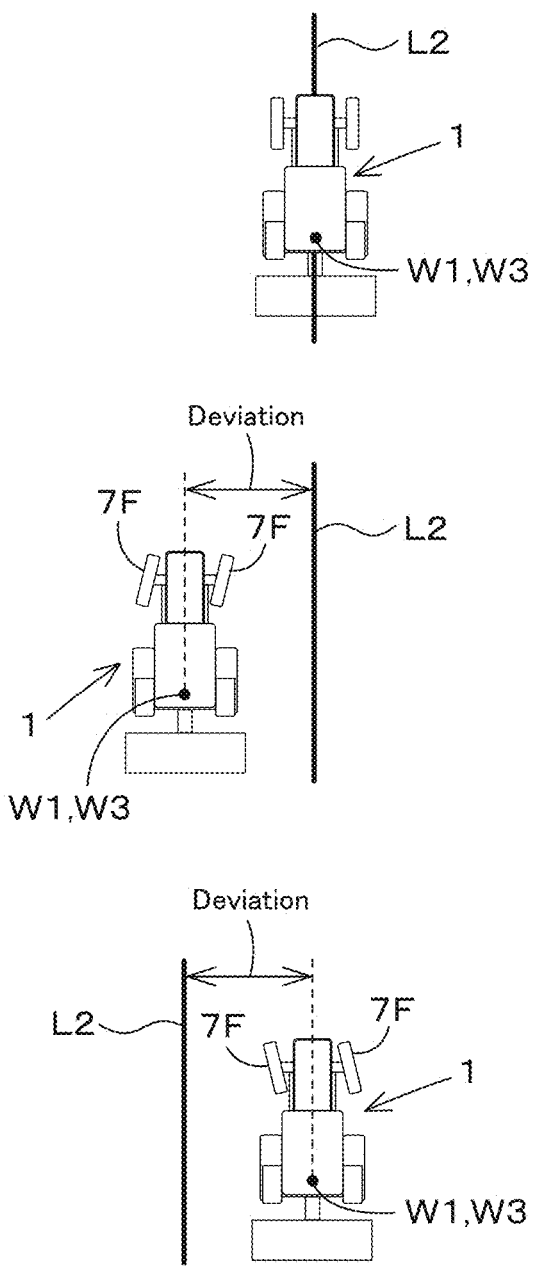
FIG. 17 is an explanation view explaining an automatic steering according to a preferred embodiment of the present invention.

As shown in FIG. 17, when the deviation between the vehicle body position and the scheduled traveling line L2 is less than the threshold value, the second control device 60B maintains the rotational angle of the rotation shaft of the steering motor 38. When the deviation (positional deviation) between the vehicle body position and the scheduled traveling line L2 is equal to or greater than the threshold value and the tractor 1 is located on the left side of the scheduled traveling line L2, the second control device 60B rotates the rotating shaft of the steering motor 38 so that the steering direction of the tractor 1 is rightward. When the deviation between the vehicle body position and the scheduled traveling line L2 is equal to or greater than the threshold value and the tractor 1 is located on the right side with respect to the scheduled traveling line L2, the second control device 60B determines that the steering direction of the tractor 1 is left. The rotation shaft of the steering motor 38 is rotated so as to be oriented. That is, the automatic steering controller portion 200 sets the steering angle in the left direction so that the positional deviation becomes zero. In the above-described preferred embodiment, the steering angle of the steering device 11 is changed based on the deviation between the vehicle body position and the scheduled traveling line L2. However, the azimuth of the scheduled traveling line L2 and the traveling direction of the tractor 1 (vehicle body 3) are changed. When the (traveling direction) azimuth (vehicle body azimuth) F1 is different, that is, when the angle θ of the vehicle body azimuth F1 with respect to the scheduled traveling line L2 is equal to or more than a threshold value, the automatic steering controller portion 200 (second control device 60B) may be set such that the steering angle such that the angle θ is zero (the vehicle body direction F1 matches the direction of the scheduled traveling line L2). In addition, the automatic steering controller portion 200 (second control device 60B) may set the final steering angle in automatic steering based on the steering angle obtained based on the deviation (positional deviation) and the steering angle obtained based on the azimuth (azimuth deviation θ). The setting of the steering angle in the automatic steering in the above-described preferred embodiment is an example, and is not limited thereto.

The third controller device 60C raises and lowers the connector portion 8 according to an operation of the operation member provided in the periphery of the driver seat 10. The first control device 60A, the second control device 60B, and the third control device 60C may be integrated. In addition, the control of the traveling system, the control of the work system, and the calculation of the vehicle body position described above are not limited thereto.

The display device 45 can be used to set the traveling of the vehicle body 3.

The details of the display device 45 will be described below.

As shown in FIG. 1, the display device 45 can acquire various information detected by the detection device 47 through an in-vehicle network or the like. The detection device 47 is an accelerator pedal sensor, a shift lever detector sensor, a crank position sensor, a fuel sensor, a water temperature sensor, a prime mover rotation sensor, a steering angle sensor, an oil temperature sensor, an axle rotation sensor, or the like. For example, the display device 45 can display, as the operation information, the remaining fuel amount detected by the fuel sensor, the water temperature value detected by the water temperature sensor, the prime mover revolving speed detected by the prime mover rotation sensor, and the like.

In addition, the display device 45 can acquire information on various switches, for example, information on the setting switch 51, the steering switch 52, and the correction switch 53. The display device 45 can obtain information on ON/OFF of the setting switch 51, information on the start and end of automatic steering by the steering switch 52, and information on commands for the starting point P10 and the finishing point P11 of the reference traveling line L1 on the steering switch 52.

As shown in FIG. 18, the display device 45 includes a display portion 46 that displays various information. The display portion 46 includes a stationary display portion 46A that displays a warning and the like, and a variable display portion 46B that can change the information to be displayed. The stationary display portion 46A includes a panel on which a graphic such as a warning is shown and an irradiation unit such as an LED that irradiates the graphic on the panel with a light source. The variable display portion 46B includes a panel such as an organic EL or a liquid crystal, and displays various information regarding the driving (traveling) of the tractor 1.

Figure 6A:
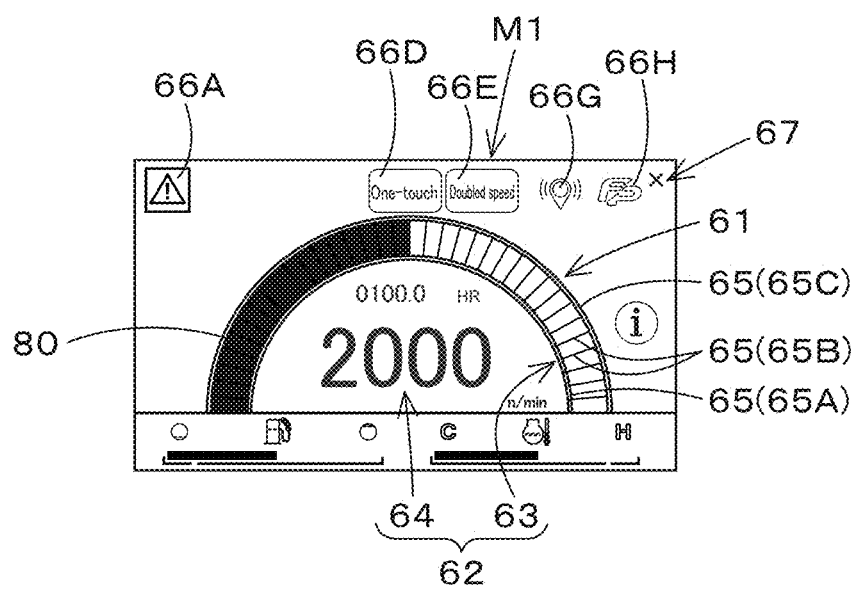
FIG. 6A is a view illustrating a driving screen M1 according to a preferred embodiment of the present invention.

FIG. 6A shows a driving screen M1 of the tractor 1. The driving screen M1 is a screen displayed on the variable display portion 46B when the setting switch 51 is OFF, that is, when the setting mode is invalid.

The display device 45, that is, the driving screen M1 includes a driving display portion 61 that shows operation information. The driving display portion 61 includes a revolving display portion 62 that displays the number of revolutions of the prime mover 4 (the number of revolutions of the prime mover) as the operation information. The revolving display portion 62 includes a level display portion 63. The level display portion 63 display the number of revolutions of the prime mover in stages. For example, the level display portion 63 includes a scale portion 65 and an index portion 80. The scale portion 65 includes, for example, a first line 65A and a plurality of second lines 65B allocated along the first line 65A at predetermined intervals. In addition, the scale portion 65 includes a first line 65A and a third line 65C spaced apart by a predetermined distance. The first line 65A and the third line 65C are formed, for example, in a semicircular shape, and one end side (for example, left side) has a minimum value and the other end side (for example, right side) has the maximum value.

The index portion 80 is a bar whose length changes according to the magnitude of the number of revolutions of the prime mover. The index portion 80 is located, for example, between the first line 65A and the third line 65C, and when the value of the prime mover revolving speed is the minimum value of zero, the indicator portion 80 is located at the one end side (left side) of the first line 65A and the third line 65C and has the shortest length. When the value of the prime mover revolving speed is the maximum value, the indicator portion 80 stretches from the one end side (left side) of the first line 65A and the third line 65C to the other end side (right side) of the third line 65C and has the longest length. The revolving display portion 62 includes a number display portion 64. The number display portion 64 displays the number of revolutions of the prime mover by a number. For example, the revolving display portion 62 is arranged inside the semicircle of the first line 65A and the third line 65C.

Thus, according to the driving display portion 61, the prime mover revolving speed such as the engine revolving speed can be displayed stepwise by the level display portion 63, and can be displayed numerically by the revolving display portion 62.

The driving screen M1 includes an icon display portion 67 that displays a plurality of icon portions 66. The icon display portion 67 is a section in which various pieces of information are indicated by the icon portion 66. That is, the setting relating to traveling such as automatic steering, for example, the setting state set in the setting mode is displayed on the icon portion 66. The icon display portion 67 is located at a position different from the driving display portion 61, and is arranged above the driving screen M1, for example.

The plurality of icon portions 66 include a first icon portion 66A, a second icon portion 66B, a third icon portion 66C, a fourth icon portion 66D, a fifth icon portion 66E, a sixth icon portion 66F, a seventh icon portion 66G, and an eighth icon portion 66H. The driving screen M1 does not need to have all of the plurality of icon portions 66 (66A, 66B, 66C, 66D, 66E, 66F, 66G, 66H), and is not limited to the above-described preferred embodiment.

The first icon portion 66A is displayed when a warning is issued. The second icon portion 66B is displayed when the starting point P10 of the reference traveling line L1 is set. The third icon portion 66C is displayed when the finishing point P11 of the reference traveling line L1 is set.

The fourth icon portion 66D is displayed when the conditions for automatic steering are satisfied. For example, the fourth icon portion 66D is displayed when the setting mode is valid, the setting of the reference traveling line L1 is completed, and the scheduled traveling line L2 can be set. Alternatively, the fourth icon portion 66D is displayed when the automatic steering is permitted. For example, the fourth icon portion 66D is displayed when the setting mode is valid and the setting of the reference traveling line L1 is completed. By watching the fourth icon portion 66D, the operator can recognize that the automatic steering is permitted. Then, the operator can start the automatic steering by operating the steering switch 52.

The fifth icon portion 66E is displayed when the connector portion 8 is in the lifting/lowering state. The sixth icon portion 66F is displayed when in the 4WD accelerating state. The color of the seventh icon portion 66G changes depending on the receiving sensitivity of the received signal of the receiver device 41.

The display of the eighth icon portion 66H changes according to the conditions of automatic steering. When the eighth icon portion 66H is in a state where automatic steering cannot be performed for some reason, for example, the setting mode is invalid, the receiving sensitivity of the received signal of the receiver device 41 is low, and the vehicle body position cannot be detected, the reference traveling line L1 is not set, the icon portion 66H will be gray to indicate that automatic steering cannot be performed. When the eighth icon portion 66H is in a state where automatic steering can be performed for some reason, for example, the setting mode is valid and the vehicle body position can be detected when the receiving sensitivity of the received signal of the receiver device 41 is equal to or higher than a predetermined level. When the reference traveling line L1 is set, the color is green indicating that automatic steering can be performed. The display form of the eighth icon portion 66H is not limited to the display form described above.

Figure 6B:
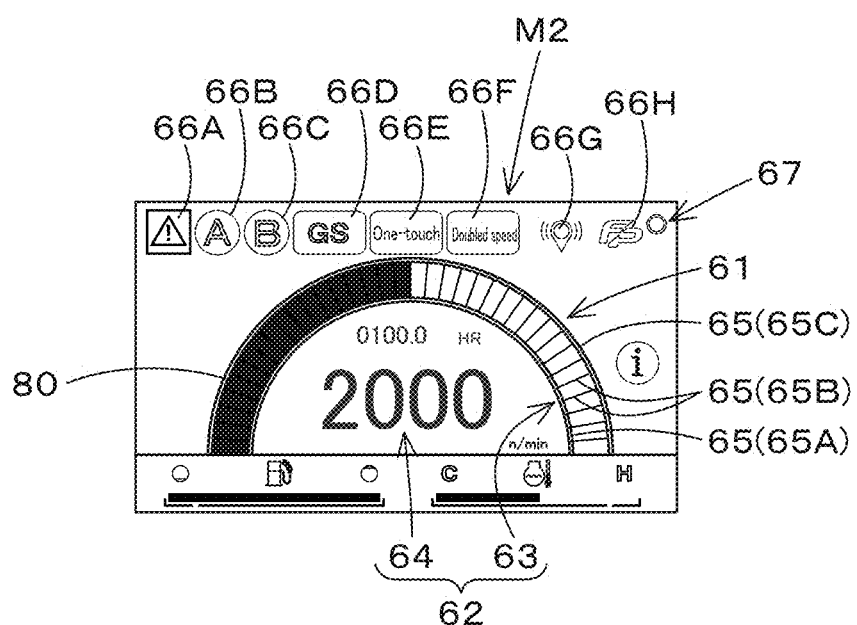
FIG. 6B is a view illustrating a driving screen M2 according to a preferred embodiment of the present invention.

FIG. 6B shows a driving screen M2 of the tractor 1. The driving screen M2 is a screen displayed on the variable display portion 46B when the setting switch 51 is ON, that is, when the setting mode is valid. The driving screen M2 also includes a driving display portion 61 and an icon display portion 67, similarly to the driving screen M1. In other words, the driving screen M2 is a screen capable of displaying the same information as the driving screen M1 at least for driving information. The driving display portion 61 and the icon display portion 67 are the same as the driving screen M1, and thus description thereof is omitted.

When the setting mode is changed from invalid to valid, the display device 45 changes the display state of the driving display portion 61 of the driving screen M2 to a display mode different from the display state of the driving display portion 61 of the driving screen M1. That is, when the setting mode is valid, the display device 45 makes the display state of the driving display portion 61 of the case where the setting mode is valid different from the display form of the driving display portion 61 of the case where the setting mode is invalid.

The display device 45 sets the color (coloring) indicating the driving display portion 61 on the driving screen M2 to be different from the color (coloring) indicating the driving display portion 61 on the driving screen M1. In particular, in the display device 45, the color of the scale portion 65 of the level display portion 63 in the driving screen M2, that is, the colors of the first line 65A, the second line 65B, and the third line 65C are the same as those of the driving screen M1. Meanwhile, the color of the indicator portion 80 of the driving screen M2 is different from that of the driving screen M1. That is, when the setting mode is valid, the color of the index portion 80 is different from the color of the index portion 80 where the setting mode is invalid.

In addition, the display device 45 sets the color of the number display portion 64 on the driving screen M2, that is, the color of the number indicating the motor rotational speed to a color different from that of the driving screen M1. That is, when the setting mode is valid, the color of the number display portion 64 is different from the color of the number display portion 64 where the setting mode is invalid.

Figure 7A:
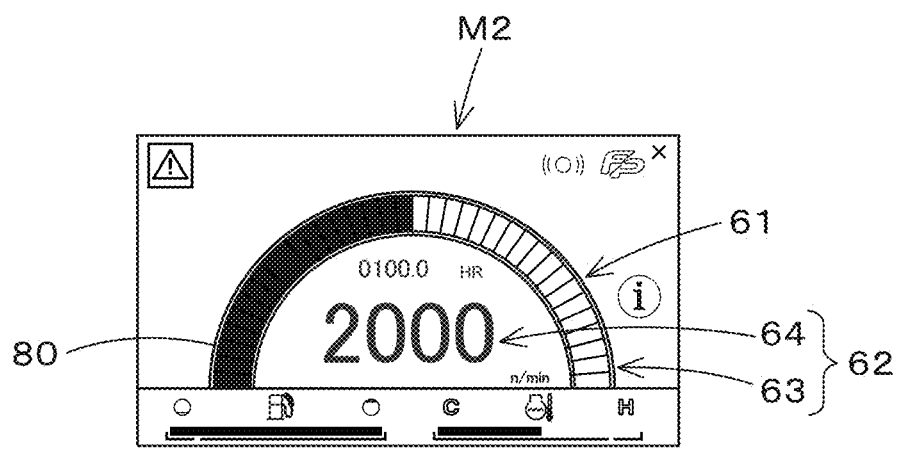
FIG. 7A is a view illustrating the driving screen M2 under a state where a reference traveling line is not set according to a preferred embodiment of the present invention.
Figure 7B:
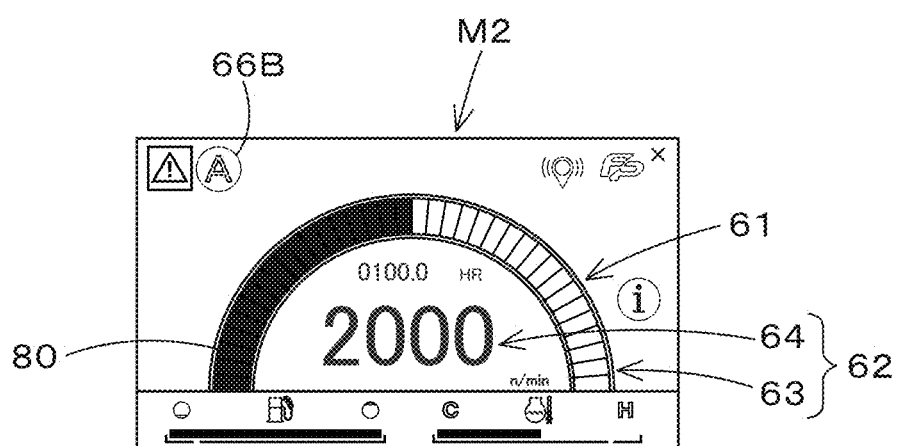
FIG. 7B is a view illustrating the driving screen M2 under a state where a starting point of the reference traveling line is set according to a preferred embodiment of the present invention.
Figure 7C:
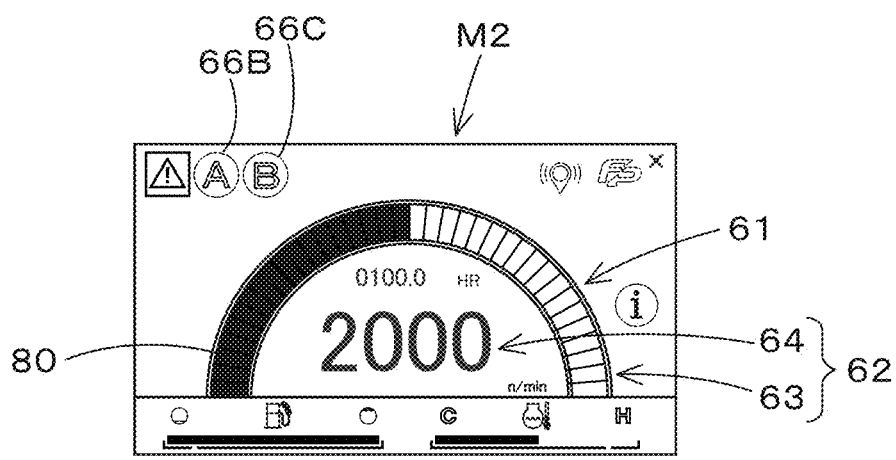
FIG. 7C is a view illustrating the driving screen M2 under a state where a finishing point of the reference traveling line is set according to a preferred embodiment of the present invention.

In the driving screen M2, since the setting mode is set, it is possible to make settings before the start of automatic steering. FIGS. 7A to 7C show screen transitions of the driving screen M2 at the time of setting the starting point P10 and the finishing point P11 of the reference traveling line L1 as settings before the start of automatic steering. As shown in FIG. 7A, when the reference traveling line L1 is not set, the second icon portion 66B and the third icon portion 66C are not displayed on the driving screen M2. When the driver sets the starting point P10 of the reference traveling line L1 by operating the steering switch 52, a second icon portion 66B is displayed on the driving screen M2 as shown in FIG. 7B. When the driver operates the steering switch 52 to set the finishing point P11 of the reference traveling line L1, the third icon portion 66C is displayed on the driving screen M2 as shown in FIG. 7C.

Thus, by operating the steering switch 52 while traveling the tractor 1 under the state where the driving screen M2 is displayed, the starting point P10 and the ending point P11 of the reference traveling line L1 can be set. In addition, the driver watches whether or not the second icon portion 66B and the third icon portion 66C are displayed on the driving screen M2, and thus it can be confirmed whether or not the reference traveling line L1 is set on the driving screen M2.

Figure 8:
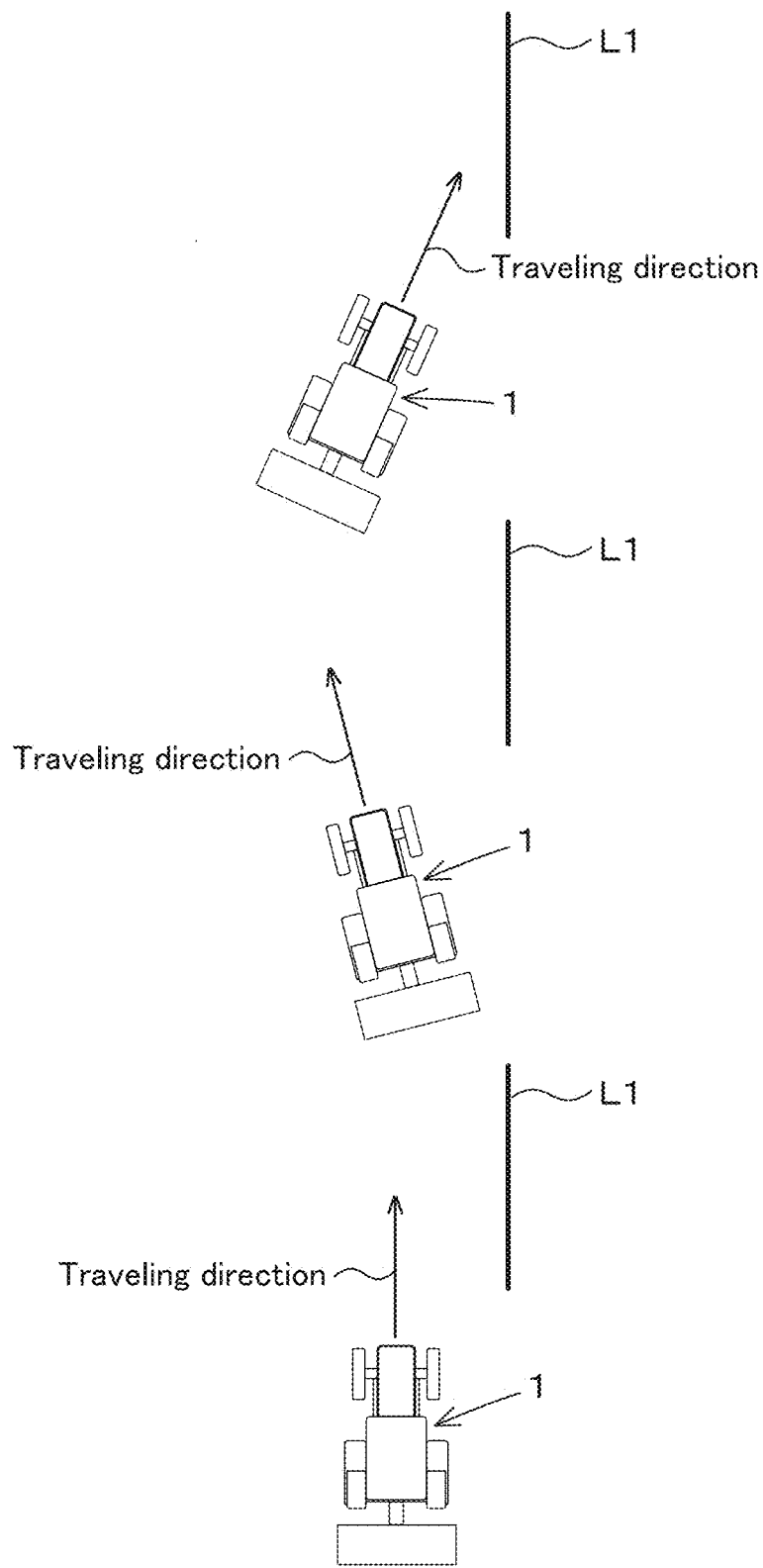
FIG. 8 is a view illustrating traveling of a tractor in conditioning traveling according to a preferred embodiment of the present invention.

Now, in order to perform the automatic steering after setting the reference traveling line L1, it is necessary to prepare the conditions for automatic steering. For example, as shown in FIG. 8, when the direction (traveling direction) of the tractor 1 is not parallel to the reference traveling line L1 after turning the tractor 1, it is difficult to steer the tractor 1 along the scheduled traveling line L2 parallel to the reference traveling line L1. In such a case, it is determined that the conditions for automatic steering are not satisfied. In this manner, after the reference traveling line L1 is set on the driving screen M2, when the conditions for the automatic steering are not satisfied, the display device 45 switches a screen on the variable display portion 46B from the driving screen M2 to the guidance screen M3 as shown in FIGS. 9A to 9D.

Figure 9A:
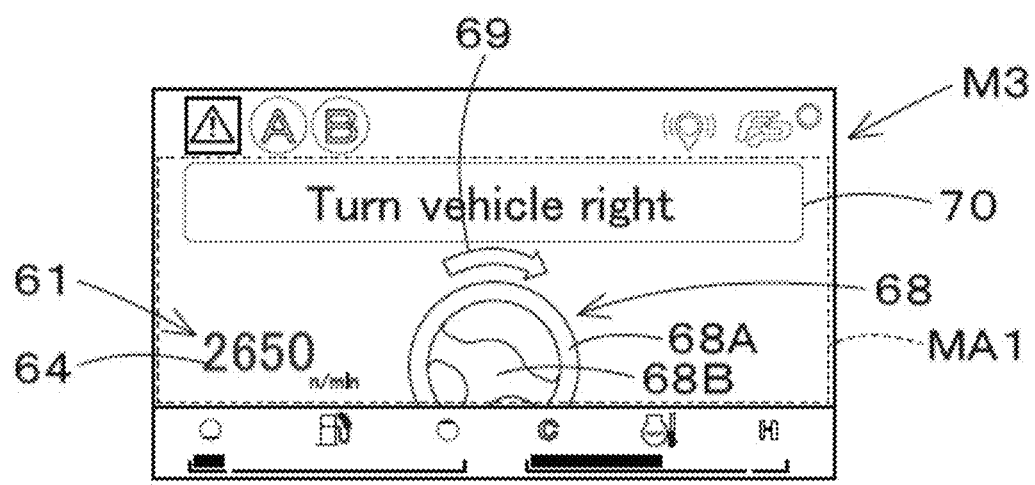
FIG. 9A is a view illustrating a guidance screen M3 representing an order to steer a vehicle body to the right according to a preferred embodiment of the present invention.
Figure 9B:
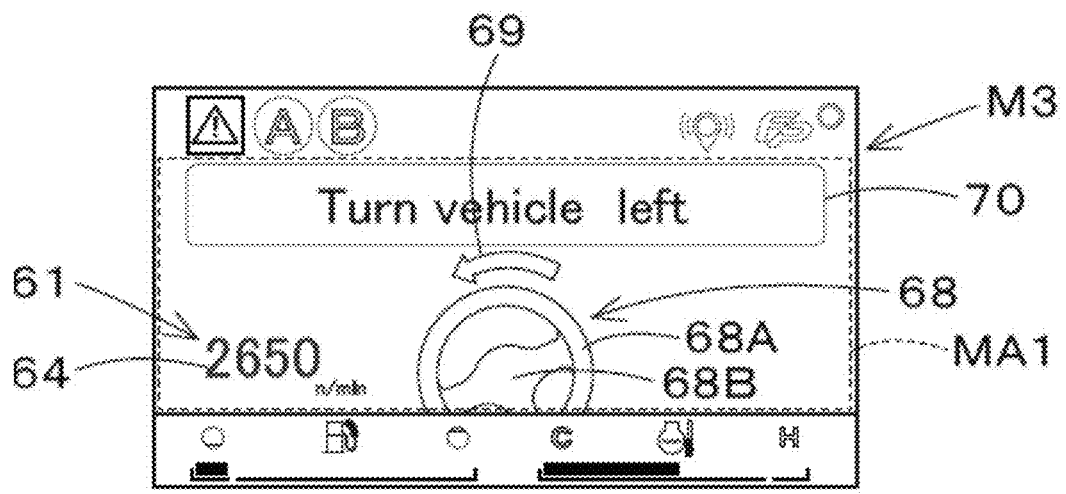
FIG. 9B is a view illustrating the guidance screen M3 representing an order to steer a vehicle body to the left according to a preferred embodiment of the present invention.

The guidance screen M3 is a screen for displaying commands (contents) relating to traveling of the vehicle body 3. In other words, the guidance screen M3 is a screen on which settings related to traveling can be set. For example, the guidance screen M3 is a screen that displays commands (contents) for adjusting traveling conditions such as the automatic steering. For example, as shown in FIGS. 9A and 9B, the guidance screen M3 is a screen for instructing to change the orientation of the vehicle body 3 at least before the start of automatic steering. For example, as shown in FIG. 9 is a screen for issuing an instruction to turn the vehicle body 3 to the right or an instruction to turn the vehicle body 3 to the left direction as illustrated in FIG. 9B. The instruction to turn the vehicle body 3 to the right or to turn the vehicle body 3 to the left is determined by the current traveling direction of the vehicle body 3. The traveling direction of the vehicle body 3 can be detected by the position detector device 40.

As shown in FIG. 8, when the traveling direction of the vehicle body 3 is oblique to the right with respect to the direction (in the longitudinal direction) in which the reference traveling line L1 extends, the guidance screen M3 gives instructions to direct the vehicle body 3 to the left. In addition, as shown in FIG. 8, when the traveling direction of the vehicle body 3 is oblique to the left with respect to the longitudinal direction of the reference traveling line L1, the guidance screen M3 displays an instruction to turn the vehicle body 3 to the right.

The guidance screen M3 includes a message display portion 70. The message display portion 70 is a portion for explaining the steering of the vehicle body 3 with characters (message). That is, the message display portion 70 is a portion that indicates the steering direction of the vehicle body 3 in characters as a traveling command (contents).

As shown in FIG. 9A, when it is necessary to turn the traveling direction of the vehicle body 3 to the right, the message display portion 70 displays characters indicating that the vehicle body 3 is turned to the right. As shown in FIG. 9B, when the traveling direction of the vehicle body 3 needs to be directed to the left, the message display portion 70 displays characters indicating that the vehicle body 3 is directed to the left.

Figure 9C:
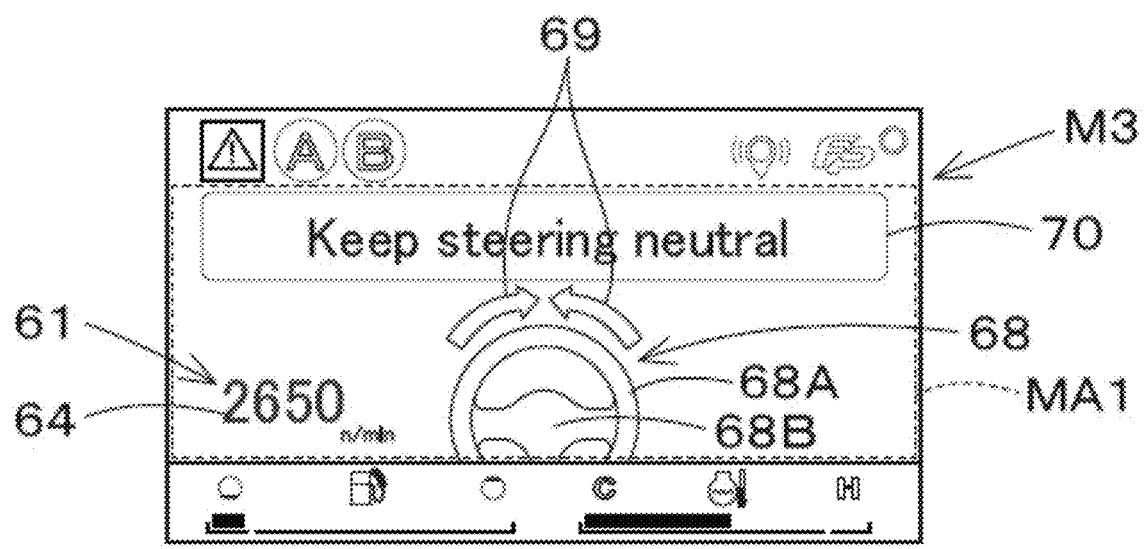
FIG. 9C is a view illustrating the guidance screen M3 representing an order to keep a vehicle body straight ahead according to a preferred embodiment of the present invention.
Figure 9D:
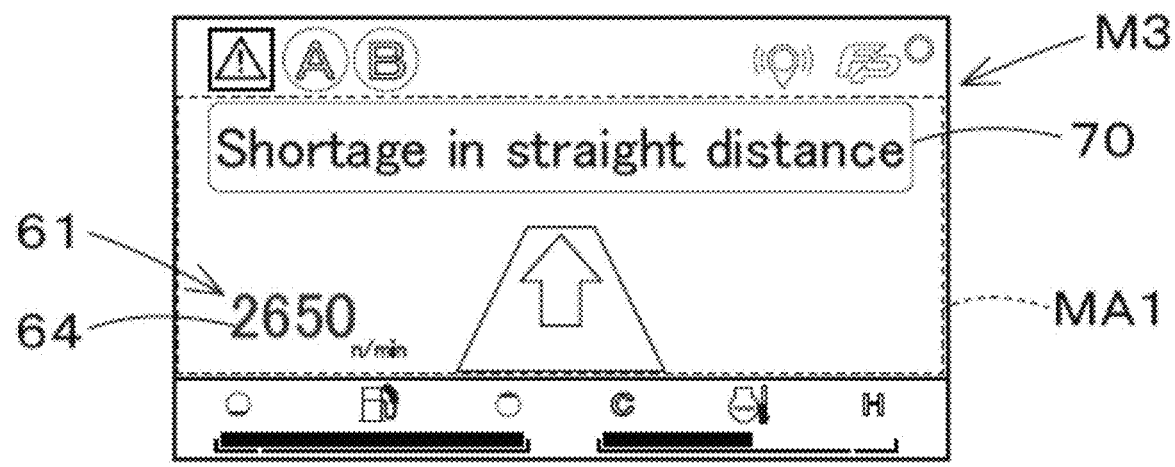
FIG. 9D is a view illustrating the guidance screen M3 of a case where a distance of straight traveling of a vehicle body is a predetermined distance or less according to a preferred embodiment of the present invention.

In addition, as shown in FIG. 9C, the message display portion 70 displays a character indicating that the vehicle body is traveling straight (straight ahead) when the traveling direction of the vehicle body 3 is maintained. As shown in FIG. 9D, the message display portion 70 displays that the vehicle body 3 has to travel straight for a predetermined distance, and when the straight travel distance does not reach the predetermined distance, the straight travel distance does not reach the predetermined distance. Note that, in FIG. 9D, a message indicating that the vehicle body 3 is traveling straight ahead for a predetermined distance may be displayed on the message display portion 70.

The guidance screen M3 includes a steering instruction portion 69. The steering instruction portion 69 is a section that indicates the steering direction of the vehicle body 3. As shown in FIG. 9A, when it is necessary to turn the traveling direction of the vehicle body 3 to the right, the steering instruction portion 69 displays an arrowed line that points the traveling direction of the vehicle body 3 to the right. As shown in FIG. 9B, the steering instruction portion 69 displays an arrowed line that directs the traveling direction of the vehicle body 3 to the left when it is necessary to direct the traveling direction of the vehicle body 3 to the left. As shown in FIG. 9C, when the traveling direction of the vehicle body 3 is maintained, a pair of arrowed lines facing each other are displayed to indicate that the vehicle body 3 is traveling straight (straight ahead).

In addition, the guidance screen M3 includes a driving display portion 61 and a steering wheel display portion 68. That is, on the guidance screen M3, the driving display portion 61 and the steering wheel display portion 68 are displayed on the same screen (one screen). In particular, on the guidance screen M3, the operation display portion 61 and the steering wheel display portion 68 are displayed in the portion (range) MA1 for which the description is changed. The driving display portion 61 on the guidance screen M3 is a portion that displays driving information, like the driving screens M1 and M2, and displays at least portion of the driving information shown on the driving screens M1 and M2. In this preferred embodiment, the driving display portion 61 on the guidance screen M3 includes a number display portion 64 that shows the number of rotations of the prime mover by numbers, and displays the number of revolutions of the engine and the like. The driving display portion 61 in the guidance screen M3 may include the revolving display portion 62 shown in the operation screens M1 and M2. Alternatively, the driving display portion 61 in the guidance screen M3 may include both the number display portion 64 and the revolving display portion 62 shown in the operation screens M1 and M2.

The steering wheel display portion 68 is a portion that shows the steering wheel 30 in a graphic form or the like. The driving display portion 61 is displayed on one side or the other side of the steering wheel display portion 68. The steering wheel display portion 68 and the steering instruction portion 69 are displayed separately. The steering wheel display portion 68 and the steering instruction portion 69 may be displayed so as to overlap each other.

The steering wheel display portion 68 includes a circular grip portion 68A that is gripped by the driver on the steering wheel 30, and a connector portion 68B that connects the grip portion 68A. The steering direction of the steering wheel display portion 68 is changed according to an instruction of the steering direction of the vehicle body 3.

For example, when the steering wheel display portion 68 and the message display portion 70 are displayed on the same screen, that is, the guidance screen M3, the steering direction of the steering wheel display portion 68 is changed according to the steering direction indicated by the message display portion 70. Alternatively, when the steering wheel display portion 68 and the steering instruction portion 69 are displayed on the same screen, that is, the guidance screen M3, the steering direction of the steering wheel display portion 68 is changed according to the steering direction indicated by the steering instruction portion 69. Alternatively, when the steering wheel display portion 68, the message display portion 70 and the steering instruction portion 69 are displayed on the same screen, the guidance screen M3, the steering direction of the steering wheel display portion 68 is changed according to the steering direction indicated by the message display portion 70 and the steering instruction portion 69.

As shown in FIG. 9A, when it is necessary to turn the traveling direction of the vehicle body 3 to the right, the handle display portion 68 indicates that the steering direction is to the right by rotating the grip portion 68A and the connector portion 68B to the right around the center of the grip portion 68A. As shown in FIG. 9B, when it is necessary to turn the traveling direction of the vehicle body 3 to the left, the handle display portion 68 indicates that the steering direction is to the left by rotating the grip portion 68A and the connector portion 68B to the left around the center of the grip portion 68B. As shown in FIG. 9C, when the traveling direction of the vehicle body 3 is maintained, the steering direction is straight because the grip portion 68A and the connector portion 68B are not rotated.

Figure 16A:
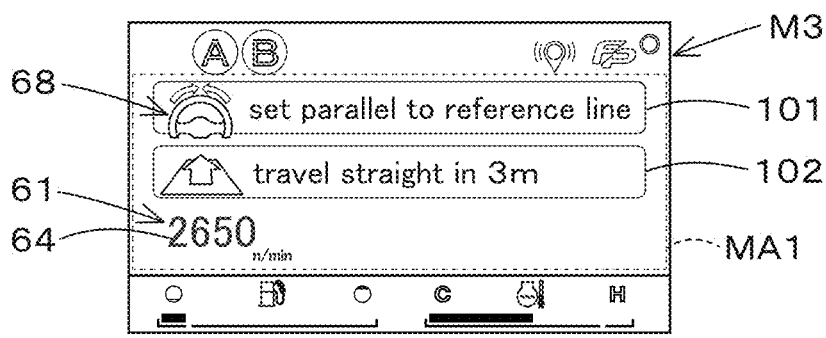
FIG. 16A is a view illustrating a modified example of the guidance screen M3 according to a preferred embodiment of the present invention.
Figure 16B:
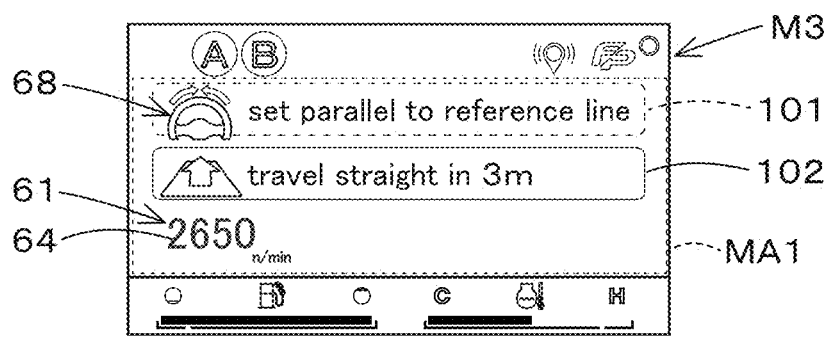
FIG. 16B is a view illustrating the guidance screen M3 after FIG. 16A according to a preferred embodiment of the present invention.

FIGS. 16A and 16B show modifications of the guidance screen M3. The guidance screen M3 includes a plurality of condition display portions that show the traveling conditions. The plurality of condition display portions are a first condition display portion 101 indicating the first condition and a second condition display portion 102 indicating the second condition. In this preferred embodiment, a condition display portion showing two conditions is described as an example, but the number of condition display portions is not limited to that in the present preferred embodiment.

The first condition display portion 101 displays, as a condition for the automatic steering, that the traveling direction of the tractor 1 (vehicle body 3) is parallel to the reference traveling line L1, for example, "please set parallel to the reference line". The second condition display portion 102 displays, as a condition for the automatic steering, a message that the tractor 1 (vehicle body 3) is to travel straight for a predetermined distance, for example, "travel straight for 3 m". In the guidance screen M3, among the plurality of condition display portions, the condition display portion (condition satisfaction display portion) in which the traveling condition is satisfied is changed from the condition display portion (condition non-satisfaction display portion) in which the traveling condition is not satisfied, and the display form is changed. For example, as shown in FIG. 16B, in the automatic steering, when the traveling direction of the tractor 1 (the vehicle body 3) is parallel to the reference traveling line L1 and the straight traveling distance is less than the predetermined distance, the first condition display portion is displayed. The color 101 is colored with a low saturation (for example, white, gray, etc.), and the color of the second condition display portion 102 is colored with a high saturation. In particular, the display device 45 sets the saturation of the character on the condition satisfied display portion to be lower than the saturation of the character on the condition non-satisfaction display portion. This allows the driver to easily understand the items that satisfy the traveling condition and the items that do not satisfy the traveling condition.

As described above, according to the guidance screen M3, since the command (content) for adjusting the traveling condition of the tractor 1 (vehicle body 3) is displayed, the driver watches the command displayed on the guidance screen M3. The tractor 1 (vehicle body 3) can be brought into a state where traveling conditions are adjusted while steering and traveling. Since the guidance information is displayed on the guidance screen M3, when it is necessary to travel the tractor 1 to adjust the traveling conditions, the tractor 1 can meet the condition under the state where the tractor 1 is traveled while watching the driving information of the tractor 1. In addition, since both the steering wheel display portion 68 and the driving display portion 61 are displayed on the guidance screen M3, for example, the tractor 1 can travel while knowing both the driving information and the steering direction of the steering wheel 30.

Figure 10A:
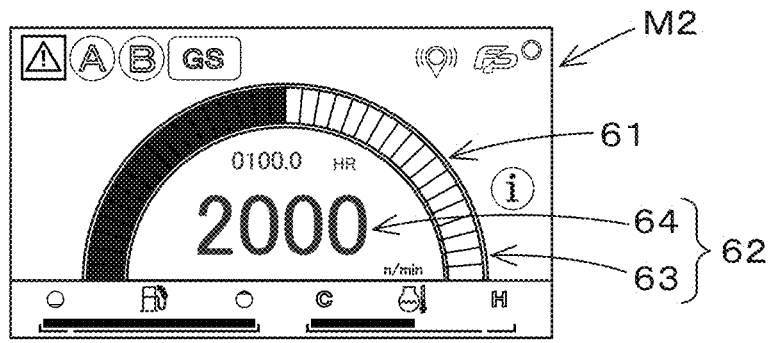
FIG. 10A is view illustrating a driving screen M2 in an automatic steering according to a preferred embodiment of the present invention.
Figure 10B:
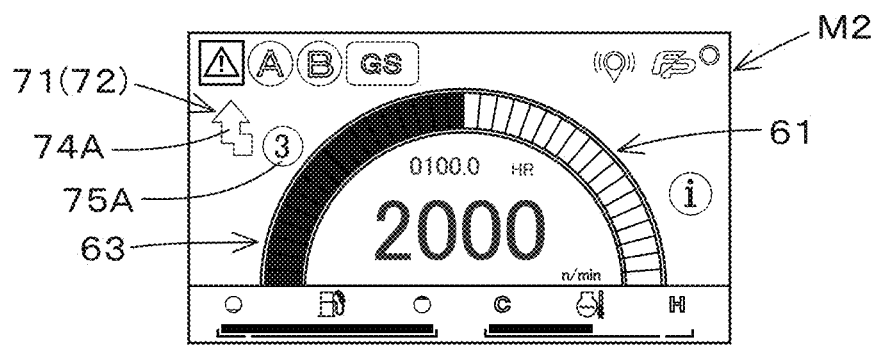
FIG. 10B is a view illustrating the driving screen M2 of a case where a correction amount to a left side of a vehicle body is set during an automatic steering according to a preferred embodiment of the present invention.
Figure 10C:
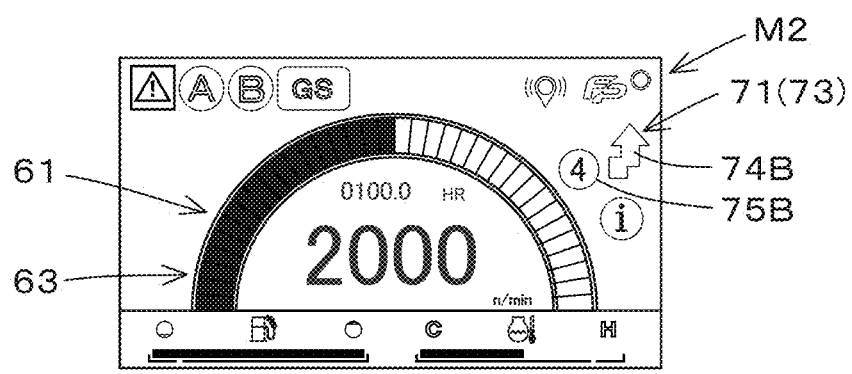
FIG. 10C is a view illustrating the driving screen M2 of a case where a correction amount to a right side of a vehicle body is set during an automatic steering according to a preferred embodiment of the present invention.

As shown in FIG. 8, when the traveling direction of the tractor 1 (vehicle body 3) becomes substantially parallel to the reference traveling line L1 and the automatic steering conditions are satisfied, the display device 45 displays a screen displayed on the variable display portion 46B. The guidance screen M3 is returned to the driving screen M2. Here, when the driver operates the steering switch 52 to start the automatic steering, the automatic steering can be performed while displaying the driving information on the driving screen M2 as shown in FIG. 10A. When the correction switch 53 is operated under the condition where the automatic steering is performed, the display device 45 displays the correction amount of the vehicle body position on the driving screen M2. As shown in FIGS. 10B and 10C, the driving display portion 61 on the driving screen M2 includes a correction display portion 71. The correction display portion 71 is a portion that displays the correction amount of the vehicle body position as the driving information. That is, the display device 45 displays the correction display portion 71 when the setting mode is valid.

As shown in FIGS. 10B and 10C, the number shown in the correction display portion 71 indicates the number of times the correction switch 53 has been operated, and the correction display portion 71 displays the number of operations as a correction amount. As described above, since the correction amount corresponds to the number of operations, the driver can grasp the correction amount stepwise by watching the number of operations.

In particular, the correction display portion 71 includes a first correction display portion 72 and a second correction display portion 73. The first correction display portion 72 is a portion that displays the correction amount (left correction amount) of the vehicle body position on one side in the width direction of the vehicle body 3, that is, the left side. The second correction display portion 73 is a portion for displaying the correction amount (right correction amount) of the vehicle body position on the other side in the width direction of the vehicle body 3, that is, on the right side. When the correction switch 53 is operated, one of the first correction display portion 72 and the second correction display portion 73 is displayed on the driving screen M2.

As shown in FIG. 10B, the first correction display portion 72 is displayed on the left side of the level display portion 63 when the first corrector portion 53A is operated during the automatic steering. As shown in FIG. 10C, the second correction display portion 73 is displayed on the right side of the level display portion 63 when the second corrector portion 53B is operated during the automatic steering. That is, the first correction display portion 72 is displayed on the left side corresponding to the first corrector portion 53A, and the second correction display portion 73 is displayed on the right side corresponding to the second corrector portion 53B.

The first correction display portion 72 includes an arrow portion 74A and a numerical value portion 75A. The arrow portion 74A indicates the corrected direction, that is, one side (left side) in the width direction of the vehicle body 3. The numerical value portion 75A indicates the number of operations of the first correction portion 53A, and the numerical value is incremented as the number of operations increases. The second correction display portion 73 includes an arrow portion 74B and a numerical value portion 75B. The arrow portion 74B indicates the corrected direction, that is, the other side (right side) in the width direction of the vehicle body 3. The numerical value portion 75B indicates the number of operations of the second correction portion 53B, and the numerical value is incremented as the number of operations increases.

Figure 11:
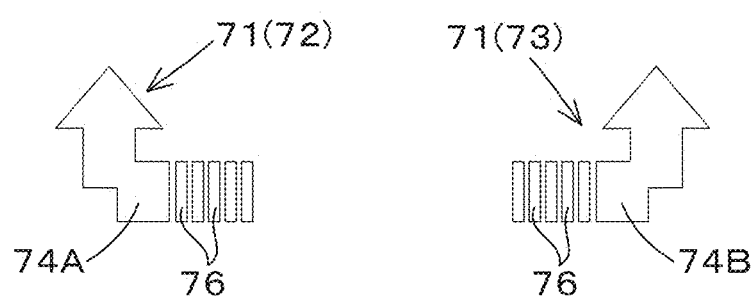
FIG. 11 is a view illustrating a modified example of a correction display portion according to a preferred embodiment of the present invention.

In the above-described preferred embodiment, the correction display portion 71 displays the number of operations as the correction amount to indicate the magnitude of the correction amount stepwise, but instead of this, the correction amount is indicated stepwise. In some cases, as shown in FIG. 11, the lengths of the arrow portions 74A and 74B are changed based on the correction amount of the vehicle body position, or a plurality of levels (index portions) 76 are provided to the arrow portions 74A and 74B. The level 76 may be changed depending on the correction amount. In the indicator portion 76, for example, the display number increases as the number of times the correction switch 53 is operated increases, or the display number increases as the steering amount of the correction switch 53 increases. In addition, the correction display portion 71 may show the correction amount itself by a number.

When the steering switch 52 is operated and the automatic steering ends under the state where the display device 45 displays the driving screen M2 of any of FIGS. 10A to 10C, the automatic steering ends on the driving screen M2. A message to that effect is displayed, and the screen returns to either the driving screen M2 shown in FIG. 9C or the driving screen M1 shown in FIG. 6A.

As described above, since the correction display portion 71 is displayed on the driving screen M2, the driver watches the correction display portion 71 during the automatic steering to be capable of easily knowing the correction amount by the correction switch 53 and the direction of the correction amount.

In the above-described preferred embodiment, when the setting screen 51 is displayed on the display device 45 and the setting switch 51 is turned from OFF to ON, a guidance for displaying a command regarding traveling of the vehicle body 3 with the driving screen M2. Although the screen M3 was displayed, when the screen switch 54 is operated from the state where the driving screen M1 is displayed or when the screen switch 54 is operated from the state where the driving screen M2 is displayed, it is possible to display such a guidance screen M4 shown in FIGS. 12A to 12C. The guidance screen M4 is a screen for making settings relating to travel, and is a screen for displaying, for example, a command (contents) for setting the reference traveling line L1 and adjusting travel conditions of the vehicle body 3. In other words, the guidance screen M4 is a screen on which navigation for adjusting traveling conditions can be displayed.

Figure 12A:
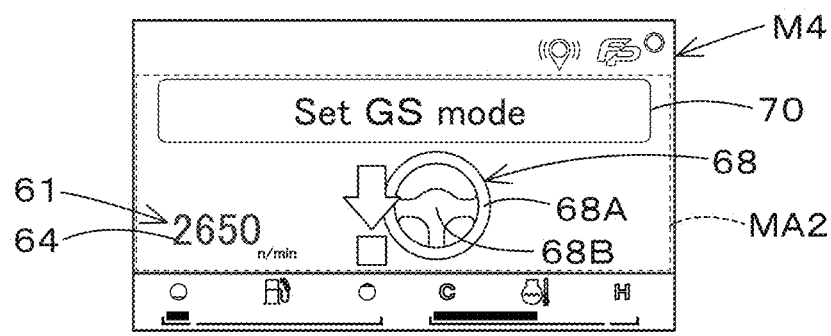
FIG. 12A is a view illustrating a guidance screen M4 before a setting mode is valid according to a preferred embodiment of the present invention.
Figure 12B:
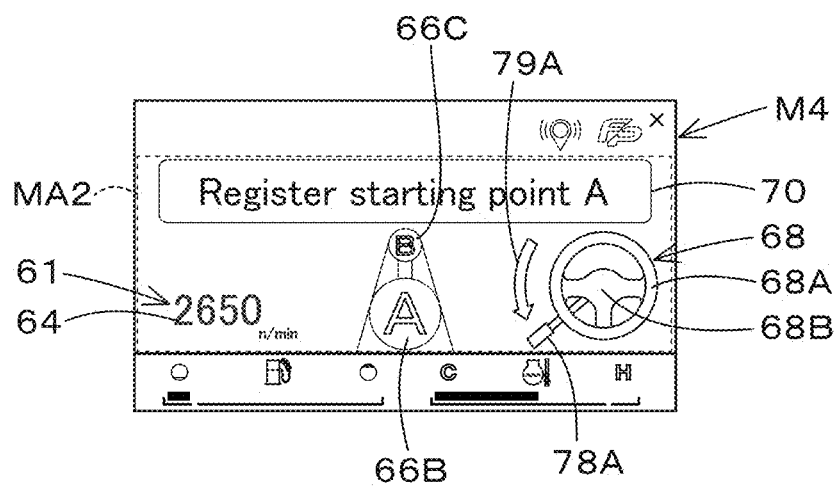
FIG. 12B is a view illustrating the guidance screen M4 in setting a starting point of a reference traveling line according to a preferred embodiment of the present invention.
Figure 12C:
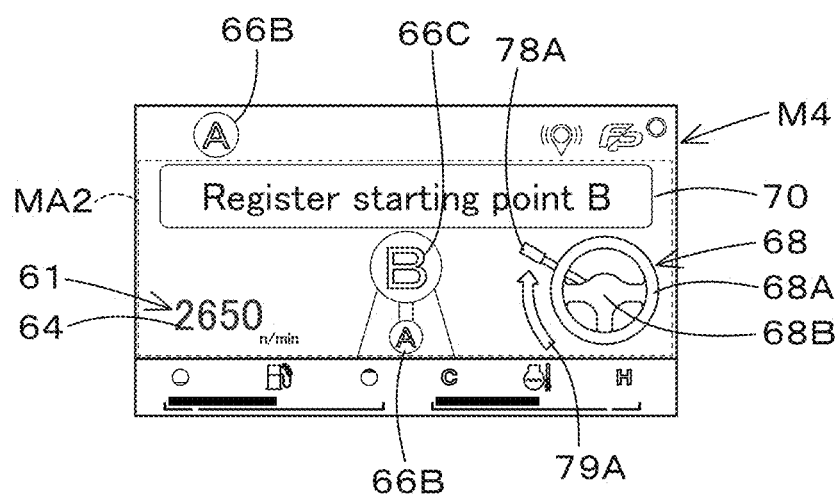
FIG. 12C is a view illustrating the guidance screen M4 in setting a finishing point of a reference traveling line according to a preferred embodiment of the present invention.

As shown in FIGS. 12A to 12C, the guidance screen M4 includes a message display portion 70, a driving display portion 61, and a steering wheel display portion 68. That is, also on the guidance screen M3, the driving display portion 61 and the steering wheel display portion 68 are displayed on the same screen (same screen).

The message display portion 70 displays various commands in characters, and as shown in FIG. 12A, when the setting mode is set to be invalid, the message display portion 70 displays that the setting switch 51 will be turned on, for example, displays "Please switch to GS mode". As shown in FIG. 12B, when the setting mode is set to be valid, the message display portion 70 displays a message indicating that the starting point P10 of the reference traveling line L1 is set, for example, displays "Register starting point". In addition, as shown in FIG. 12C, the message display portion 70 displays a message indicating that the starting point P10 of the reference traveling line L1 is set, for example, displays "Please register the ending point".

Similarly to the driving screens M1 and M2, the driving display portion 61 on the guidance screen M4 is a portion for displaying driving information, and at least a portion of the driving information shown on the driving screens M1 and M2 is displayed. In the guidance screen M4, the operation display portion 61 is displayed in the portion (range) MA2 where the explanation is changed. In this preferred embodiment, the driving display portion 61 on the guidance screen M4 includes a number display portion 64 that shows the number of rotations of the prime mover by numbers, and displays the number of revolutions of the engine and the like. The driving display portion 61 in the guidance screen M4 may also include the revolving display portion 62 shown in the operation screens M1 and M2. Alternatively, the driving display portion 61 on the guidance screen M4 may also include both the number display portion 64 and the revolving display portion 62 shown in the operation screens M1 and M2.

The handle display portion 68 on the guidance screen M4 also has a grip portion 68A and a connector portion 68B. In addition, the steering wheel display portion 68 on the guidance screen M4 shows a switching display portion 78A in which the steering switch 52 is displayed in a figure. As shown in FIG. 12B, the switching display portion 78A shows the operation position when setting the starting point P10 of the reference traveling line L1, and the tip portion of the switching display portion 78A is located on the side below the grip portion 68A than the neutral position. As shown in FIG. 12C, the switching display portion 78A shows the operation position when setting the finishing point P11 of the reference traveling line L1, and the tip portion of the switching display portion 78A is located above the grip portion 68A from the neutral position. In addition, the guidance screen M4 shows the operating direction of the steering switch 52 by the arrow portion 79A corresponding to the switching display portion 78A when setting the starting point P10 and the finishing point P11 of the reference traveling line L1. In addition, on the guidance screen M4, a second icon portion 66B indicating the starting point P10 of the reference traveling line L1 and the third icon portion 66C indicating a finishing point P11 of the reference traveling line L1 are displayed at a position different from the icon display portion 67, that is, at the center in the width direction.

Figure 13:
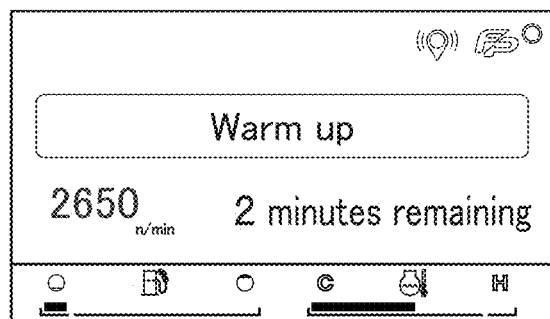
FIG. 13 is a view illustrating a screen in warming-up according to a preferred embodiment of the present invention.

When the screen switch 54 is operated and the position detector device 40 needs to be warmed up, the display device 45 displays a warm-up screen indicating the warm-up as shown in FIG. 13. When the warm-up is completed, the display device 45 switches to the guidance screen M4 shown in FIG. 12A.

On the guidance screen M4, it is possible to set the reference traveling line L1 with explanation. That is, the reference traveling line L1 can be set also on the driving screen M2, but the display device 45 displays the guidance screen M4 separately from the driving screen M2, so that the driver does not know the automatic steering setting. Even when the guidance screen M4 is set, the reference traveling line L1 can be set.

In addition, when the driving reference line L1 and the like are set by a command related to traveling on the guidance screen M4 and then the operating screens M1 and M2 are switched by an operation such as screen switching, the operating screens M1 and M2 include the reference traveling line L1. The setting of the starting point P10 and the setting of the finishing point P11 are displayed by the second icon portion 66B and the third icon portion 66C.

In addition, as shown in FIGS. 12A to 12C, in the guidance screen M4, when the automatic steering condition is not satisfied after the setting of the reference traveling line L1, the display device 45 displays as shown in FIG. 9A to FIG. 9D. The screen displayed on the variable display portion 46B is switched from the guidance screen M4 to the guidance screen M3. In addition, the display device 45 switches the screen displayed on the variable display portion 46B from the guidance screen M4 to the guidance screen M3, and then, when the automatic steering condition is satisfied, as shown in FIG. 14A, the guidance screen M4 is displayed again.

Figure 14A:
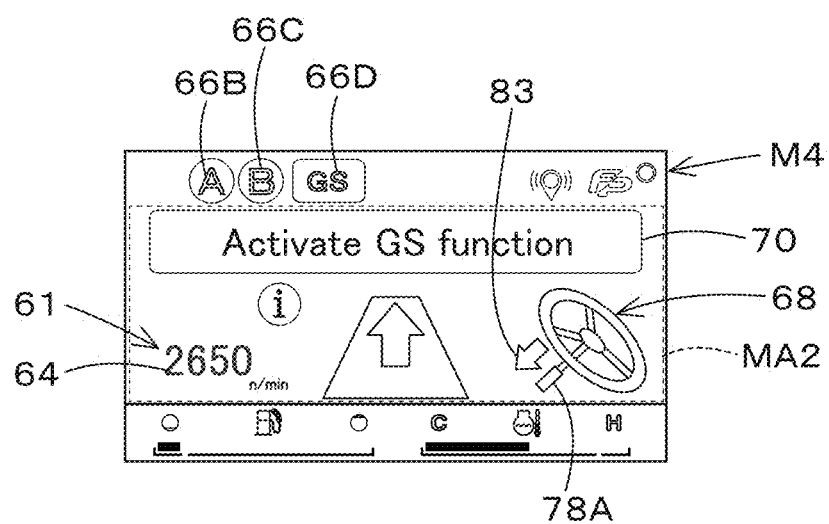
FIG. 14A is a view illustrating the guidance screen M4 just after conditioning an automatic steering according to a preferred embodiment of the present invention.

As shown in FIG. 14A, when the reference traveling line L1 is set and the conditions for automatic steering are satisfied, the guidance screen M4 displays the fourth icon portion 66D in addition to the second icon portion 66B and the third icon portion 66C. In addition, in a situation where the automatic steering is not started, the message display portion 70 of the guidance screen M4 indicates that the automatic steering by the steering switch 52 can be started, for example, "Please turn on the GS function" is displayed. In addition, in the situation where the automatic steering is not started, the arrow portion 83 is displayed on the guidance screen M4. The arrow portion 83 is located in the vicinity of the steering wheel display portion 68 and the switching display portion 78A and indicates the operation direction of the steering switch 52 for instructing the start of automatic steering. As shown in FIG. 14A, when the automatic steering conditions are satisfied and the automatic steering is not started, the message display portion 70 and the arrow portion 83 shown on the guidance screen M4 indicate that the automatic steering by the steering switch 52 is performed. The instruction display portion indicates that the start is possible. The display method of the message display portion 70 and the arrow portion 83 is not limited to the above preferred embodiments. In addition, although both the message display portion 70 and the arrow portion 83 are shown as the instruction display portion, the instruction display portion may be either one of the message display portion 70 and the arrow portion 83.

Figure 14B:
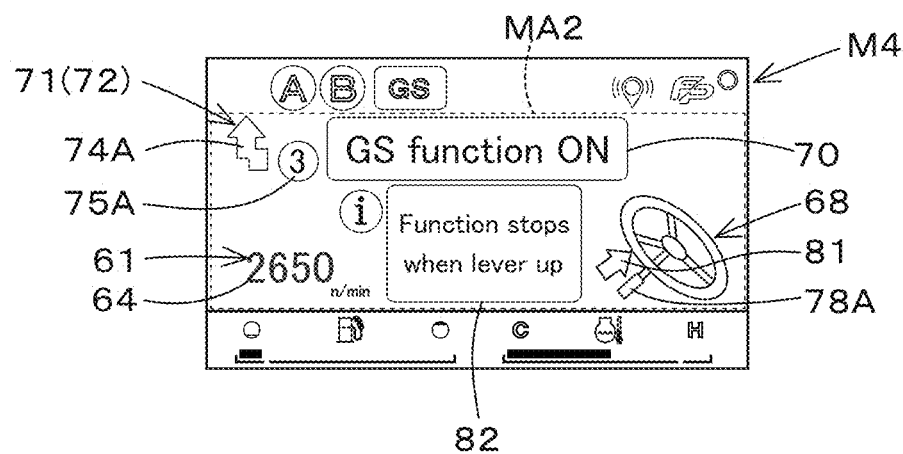
FIG. 14B is a view illustrating the guidance screen M4 of the case where the correction amount to the left side of the vehicle body is set during an automatic steering according to a preferred embodiment of the present invention.
Figure 14C:
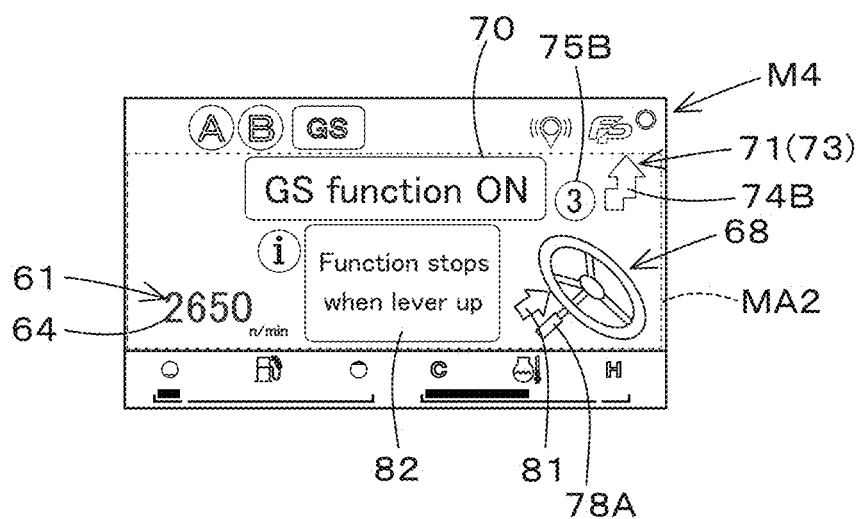
FIG. 14C is a view illustrating the guidance screen M4 of the case where the correction amount to the right side of a vehicle body is set during an automatic steering according to a preferred embodiment of the present invention.

When the driver operates the steering switch 52 to start automatic steering, the display state of the guidance screen M4 changes to the state shown in FIG. 14B and FIG. 14C. As shown in FIGS. 14B and 14C, the driving display portion 61 and the steering wheel display portion 68 are displayed on the guidance screen M4 even after the automatic steering is started.

As shown in FIG. 14B and FIG. 14C, after the automatic steering is started, a message display portion 82 is displayed on the guidance screen M4 in addition to the message display portion 70. The message display portion 82 displays a message indicating that the automatic steering is stopped (finished) by operating the steering switch 52, for example, "stop function by lever operation". After the start of automatic steering, an arrowed line 81 is displayed on the guidance screen M4. An arrow portion 81 is located in the vicinity of the steering wheel display portion 68 and the switching display portion 78A and indicates the operation direction of the steering switch 52 for instructing the finish of automatic steering.

In addition, when the correction switch 53 is operated under the condition that the automatic steering is performed, the display device 45 displays the correction amount of the vehicle body position, that is, the correction display portion 71 on the guidance screen M4. The correction display portion 71 displayed on the guidance screen M4 is the same as the correction display portion 71 displayed on the driving screen M2, and displays the number of operations as a correction amount. The correction display portion 71 displayed on the guidance screen M4 also includes a first correction display portion 72 and a second correction display portion 73. As shown in FIG. 14B, the first correction display portion 72 of the guidance screen M4 is displayed on the left side of the message display portion 82 when the first corrector portion 53A is operated during the automatic steering. As shown in FIG. 14C, the second correction display portion 73 is displayed on the right side of the message display portion 82 when the second corrector portion 53B is operated during the automatic steering. Although the first correction display portion 72 of the guidance screen M4 includes an arrow portion 74A and a numerical value portion 75A, the second correction display portion 73 of the guidance screen M4 includes an arrow portion 74B and a numerical value portion 75B. Since the operation screen is the same as the driving screen M2, the description thereof will be omitted.

When the display device 45 displays the guidance screen M4 of either FIG. 14B or 14C, when the steering switch 52 is operated and the automatic steering ends, the automatic steering ends on the guidance screen M4. A message to that effect is displayed, and the screen returns to either the guidance screen M4 shown in FIG. 14A or the driving screen M1 shown in FIG. 6A.

Now, as described above, the display device 45 can display the conditions for maintaining the traveling such as the automatic steering after the traveling conditions such as the automatic steering have been established. In particular, the display device 45 displays the guidance screen M4 for maintaining the automatic steering during the automatic steering. FIG. 14B and FIG. 14C, when the vehicle speed of the tractor 1 (vehicle body 3) becomes equal to or higher than a predetermined speed in a situation where automatic steering is performed while displaying the guidance screen M4 shown in FIGS. 14B and 14C, the guidance screen M4 switches to the guidance screen M4 in FIG. 15A. The message display portion 70 of the guidance screen M4 of FIG. 15A displays the state of the tractor 1 during the automatic steering, that is, the fact that the vehicle speed is excessive. In addition, the message display portion 82 of the guidance screen M4 displays, as a condition for maintaining the automatic steering, a message indicating that the vehicle speed is to be reduced, "speed is over. Please slow down". In addition, the driving display portion 61 of the guidance screen M4 includes a vehicle speed display portion 90. The vehicle speed display portion 90 displays the current vehicle speed, that is, the vehicle speed during the automatic steering as a number. When the driver operates the accelerator or the like to reduce the vehicle speed of the tractor 1 (vehicle body 3) to a value equal to or lower than the vehicle speed determined by the automatic steering, the guidance screen M4 is switched to the guidance screen M4 shown in FIGS. 14B and 14C again.

Figure 15A:
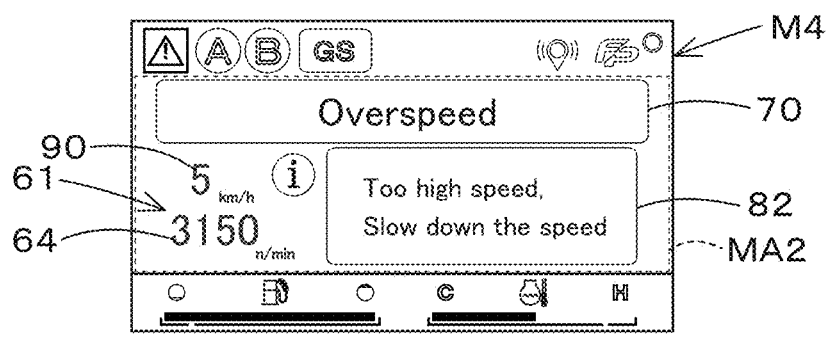
FIG. 15A is a view illustrating the guidance screen M4 of a case where a vehicle speed is a predetermined speed or more during an automatic steering according to a preferred embodiment of the present invention.
Figure 15B:
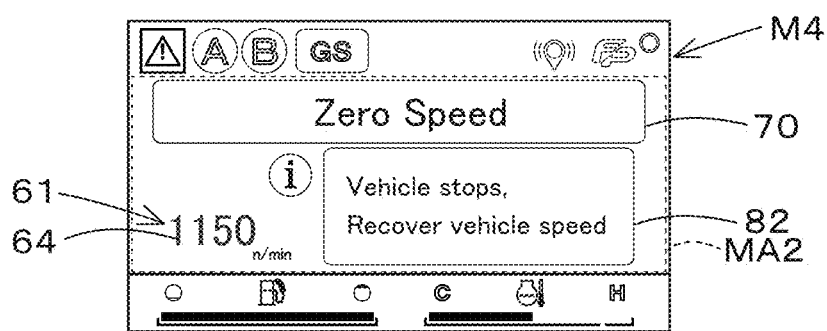
FIG. 15B is a view illustrating the guidance screen M4 of a case where the vehicle speed is zero during an automatic steering according to a preferred embodiment of the present invention.

In addition, when the vehicle speed of the tractor 1 (vehicle body 3) becomes zero under a situation where automatic steering is performed while displaying the guidance screen M4 shown in FIGS. 14B and 14C, the guidance screen M4 shown in FIGS. 14B and 14C switches to the guidance screen M4 in FIG. 15B. The message display portion 70 of the guidance screen M4 of FIG. 15B displays the state of the tractor 1 during the automatic steering, that is, the fact that the vehicle speed is zero. In addition, the message display portion 82 of the guidance screen M4 displays, as a condition for maintaining the automatic steering, a message indicating that the vehicle speed is higher than zero, "the vehicle is stopped. Please recover the speed". When the driver operates the accelerator or the like to increase the vehicle speed of the tractor 1 (vehicle body 3) above zero, the guidance screen M4 is switched to the guidance screen M4 shown in FIGS. 14B and 14C again.

In the above-described preferred embodiment, while the guidance screen M4 displayed after the start of the automatic steering is being displayed, FIG. 15A and FIG. 15B are shown as screens indicating the conditions for maintaining the automatic steering. When the automatic steering is performed while displaying the screen M2, when the vehicle speed becomes equal to or higher than a predetermined speed or when the vehicle speed becomes zero, a screen displayed on the variable display portion 46B is displayed from the driving screen M2. It may switch to the guidance screen M4 of FIG. 15A or the guidance screen M4 of FIG. 15B. After the screen displayed on the variable display portion 46B is switched to the guidance screen M4 of FIG. 15A and the guidance screen M4 of FIG. 15B, when the condition for maintaining the automatic steering is satisfied, the guidance screen M4 is switched to the driving screen M2.

The working vehicle 1 is provided with a vehicle body 3 capable of traveling, a steering handle 30 to steer the vehicle body 3 by a rotating operation, a position detection device 40 provided on the vehicle body 3 to detect the position of the vehicle body 3 based on a signal from a positioning satellite, the correction switch 53 to instruct the correction of the position of the vehicle body 3 detected by the position detector device 40, and an automatic steering mechanism 37 to automatically steer the vehicle body 3 based on the corrected vehicle body position which is the position of the vehicle body 3 corrected by the operation of the correction switch 53 and on the scheduled traveling line L2. According to this structure, even when the position of the vehicle body 3 (calculated vehicle body position W1) detected by the position detector device 40 due to various influences deviates from the actual position W2 of the working vehicle 1 (vehicle body 3) such as the actual tractor 1, it is possible to drive the vehicle body 3 along the scheduled traveling line L2 by correcting the position of the vehicle body 3 (vehicle body position) by the correction switch 53 after the start of the automatic steering. That is, since the calculation vehicle body position W1 can be corrected by the correction switch 53, the influence of the detection accuracy of the position detector device 40 can be reduced.

The correction switch 53 includes a first corrector portion 53A that commands the correction of the position of the vehicle body 3 on one side in the width direction of the vehicle body 3 and a second corrector portion 53B that commands the correction of the position of the vehicle body 3 on the other side in the width direction of the vehicle body 3. According to this, even when the calculated vehicle body position W1 deviates to one side or the other side, the calculated vehicle body position W1 can be easily corrected in the direction of deviation by the first corrector portion 53A and the second corrector portion 53B.

The correction switch 53 is connected, and the control device 60 that controls the automatic steering mechanism 37 is provided. The control device 60 sets the correction amount of the position of the vehicle body 3 based on the number of times the correction switch 53 is operated. According to this, the driver can change the correction amount only by increasing or decreasing the number of times the correction switch 53 is operated.

The control device 60 sets the correction amount of the position of the vehicle body 3 based on the operation amount of the correction switch 53. According to this, the driver can change the correction amount only by adjusting the operation amount of the correction switch 53.

The working vehicle 1 includes a steering switch 52 that switches between automatic steering and manual steering. According to this, the switching between the automatic steering in which the vehicle body 3 travels along the scheduled traveling line L2 and the manual steering in which the driver travels the vehicle body 3 using the steering wheel 30 can be simplified.

In addition, the working vehicle 1 includes a steering wheel 30, a vehicle body 3 that can be driven by either manual steering by the steering wheel 30 or automatic steering of the steering wheel 30 based on a planned traveling line, and at least a setting switch 51 to switch the setting mode to be set to valid or invalid before starting the automatic steering, and a driving display portion 61 to display driving information when the vehicle body 3 is traveling, and includes a display device 45 to change the display state of the driving display portion 61 to a display state different from the invalid setting mode when the setting mode is switched to valid. According to this, in the vehicle body 3 in which the manual steering and the automatic steering can be performed, the driver can easily know whether or not to perform the setting before the automatic steering only by watching the driving display portion 61.

The working vehicle 1 includes the prime mover 4, the driving display portion 61 includes a revolving display portion 62 that displays the rotational speed of the prime mover as driving information, and the display device 45 sets the color of the revolving display portion 62 in the setting mode. According to this, it is possible to indicate whether the setting mode is valid or invalid depending on the color difference of the rotational speed of the prime mover that the driver particularly pays attention to when driving. In other words, the driver can be promptly aware that the setting mode is effective.

The revolving display portion 62 includes a level display portion 63 that displays the number of revolutions of the prime mover stepwise, and a number display portion 64 that displays the number of rotations of the prime mover by numbers. According to this, the driver can easily understand whether the setting mode is valid or invalid, at least at the time of watching either the level display portion 63 or the rotational speed of the prime mover.

The working vehicle 1 is provided on the vehicle body 3 and detects a position of the vehicle body 3 based on a signal from a positioning satellite, and a correction switch 53 to correct the position of the vehicle body 3 detected by the position detector device 40. The driving display portion 61 includes a correction display portion 71 that displays the correction amount of the position of the vehicle body 3 by the correction switch 53 as the driving information, and the display device 45 displays the correction display portion 71 in the setting mode. According to this, the driver can simultaneously grasp the driving information displayed on the driving display portion 61 and the correction amount displayed on the correction display portion 71, and can easily grasp the situation of automatic steering.

The correction display portion 71 displays the number of operations of the correction switch 53 as the correction amount. According to this, the driver can easily understand how much the calculated vehicle body position W1 has been corrected, simply by watching the number of times the correction switch 53 is displayed on the correction display portion 71. The correction display portion 71 displays the magnitude of the correction amount stepwise. According to this, the driver can easily understand how much the calculated vehicle body position W1 has been corrected by merely watching the level of the correction amount displayed on the correction display portion 71.

The correction display portion 71 displays the correction amount of the position of the vehicle body 3 on one side in the width direction of the vehicle body 3 and the correction amount of the position of the vehicle body 3 on the other side in the width direction of the vehicle body 3. The second correction display portion 73 is included. According to this, only by watching one of the first correction display portion and the second correction display portion 73, what is the calculated correction amount for one side or the other side in the width direction of the vehicle body 3 can be easily grasped.

The working vehicle 1 includes a display device 45. The display device 45 includes a steering wheel display portion 68 showing the steering handle 30 and a driving display portion 61 for displaying driving information when the vehicle body 3 is traveling. The display portion 68 and the driving display portion 61 are displayed on the same screen. According to this, since the steering wheel display portion 68 and the driving display portion are displayed on the same screen, when performing either automatic steering or manual steering, the state regarding the steering wheel 30 and the driving information are grasped at the same time. That is, the driver can easily understand the steering of the steering wheel. For example, by watching the driving display portion and the steering wheel display portion that are displayed on the same screen, the driver can see the driving information at the time of traveling and the steering of the steering wheel during either the manual steering or the automatic steering.

The steering wheel display portion 68 and the driving display portion 61 are displayed on a guidance screen to instruct to change the orientation of the vehicle body 3 at least before the start of automatic steering. According to this, when it is necessary to change the direction of the vehicle body 3 before the start of automatic steering, the driver can steer the steering wheel 30 while watching the steering wheel display portion 68, and at the time of steering the steering wheel 30. The driving information can be determined from the driving display portion 61.

The display device 45 includes a steering instruction portion 69 which is displayed on the same screen and indicates the steering direction of the vehicle body 3. According to this, the driver can simultaneously view the steering wheel display portion 68 and the steering instruction portion 69 on the same screen, and it is necessary to steer the steering wheel 30 from the steering wheel display portion 68, and the steering direction of the steering wheel 30.

The display device 45 includes a message display portion 70 that displays a message explaining the steering of the vehicle body 3 on the same screen. According to this, the driver can simultaneously view the steering wheel display portion 68 and the message display portion 70 on the same screen, and the steering wheel 30 needs to be steered from the steering wheel display portion 68.

The steering direction of the handle display portion 68 is changed according to the instruction of the steering direction. According to this, the driver can grasp the steering direction of the steering wheel 30 only by watching the steering wheel display portion 68.

The working vehicle 1 includes at least the setting switch 51 that switches to a setting mode in which setting is performed before the start of automatic steering, and in the setting mode, the steering wheel display portion 68 and the driving display portion 61 are displayed on the same screen. According to this, the setting before the start of the automatic steering can be easily performed while observing the steering wheel display portion 68 and the operation display portion 61.

The display device 45 includes a steering switch 52 that switches the start or end of automatic steering in the setting mode, and the display device 45 has an instruction display portion indicating that automatic steering can be started by the steering switch 52. According to this, in the case where the driver can know whether or not the automatic steering can be performed and also can perform the automatic steering only by watching the instruction display portion displayed on the display device 45. In addition, the start of automatic steering can be easily switched by the steering switch 52.

The working vehicle 1 includes a vehicle body 3 that can travel, a steering wheel 30 that steers the vehicle body 3, a driving screen that displays driving information when the vehicle body 3 travels, and a guidance screen that displays a command regarding traveling of the vehicle body 3, and a display device 45 capable of displaying. The display device 45 displays at least a part of the driving information displayed on the driving screen on the guidance screen. According to this, when the driver sets the traveling of the vehicle body 3 while watching the guidance screen, the driving information is displayed on the guidance screen, so that the traveling can be easily set. In other words, the driver can easily drive while watching the guidance screen.

The working vehicle 1 includes the prime mover 4, and the display device 45 displays the rotational speed of the prime mover on the guidance screen as driving information. According to this, since the rotational speed of the prime mover which is important in the operation of the working vehicle 1 is displayed on the guidance screen, the driver can drive the working vehicle 1 while watching the rotational speed of the prime mover on the guidance screen.

The working vehicle 1 includes the driver seat 10, and the display device 45 is provided in front of the driver seat 10 and at a position corresponding to the steering wheel 30. According to this, the driver can see the guidance screen displayed on the display device 45 in a state where the driver sits in the normal driver seat 10 to drive, and can drive while grasping the information on the guidance screen.

The display device 45 displays, on the guidance screen, the message display portions 70 and 77 that indicate commands (contents) in characters and the driving display portion 61 that indicates operation information. According to this, the operation corresponding to the message display portions 70 and 77 can be performed while observing both the information on the message display portions 70 and 77 and the operation information displayed on the driving display portion 61.

The working vehicle 1 includes a vehicle body 3 that can travel, a steering wheel 30 that steers the vehicle body 3, and at least a display device 45 that can display a guidance screen that displays a command to adjust the traveling conditions of the vehicle body 3. According to this, when it is necessary to adjust the traveling conditions in the working vehicle 1 to perform traveling, the driver can easily adjust the traveling conditions simply by watching the guidance screen.

The display device 45 displays the guidance screen before the start of the automatic steering and also displays the steering instruction portion 69 indicating the steering direction of the vehicle body 3 corresponding to the traveling condition on the guidance screen. According to this, when it is necessary to adjust the traveling condition before the start of the automatic steering, the driver only needs to look at the steering instruction portion 69 displayed on the guidance screen to perform the steering to adjust the traveling condition of the automatic steering.

The display device 45 displays the guidance screen before the start of the automatic steering, and also displays the steering wheel display portion 68 showing the steering handle 30 facing the steering direction of the vehicle body 3 corresponding to the traveling condition on the guidance screen. According to this, when it is necessary to adjust the traveling condition before the start of the automatic steering, the driver only needs to look at the steering wheel display portion 68 of the guidance screen to move the steering wheel in the steering direction indicated by the steering wheel display portion 68. It can be easily grasped that the traveling condition of the automatic steering can be adjusted by steering the steering wheel 30, and the traveling condition of the automatic steering can be easily adjusted.

The working vehicle 1 includes a steering switch 52 to switch between manual steering and automatic steering, and the display device 45 displays a command to switch the steering switch 52 to automatic steering on the guidance screen when traveling conditions are satisfied during traveling. According to this, the driver can easily understand that the automatic steering can be performed when the instruction to switch the steering switch 52 to the automatic steering is displayed.

When the traveling is started after the traveling conditions of the vehicle body 3 are adjusted, the display device 45 displays the condition to maintain the traveling. According to this, even after the traveling of the vehicle body 3, the conditions for maintaining the traveling can be adjusted.

The display device 45 displays the condition for maintaining the automatic steering as the condition for maintaining the traveling after the start of the automatic steering. According to this, even after the automatic steering of the vehicle body 3 is started, the conditions for maintaining the automatic steering can be adjusted.

The display device 45 displays the driving information of the vehicle body 3 on the guidance screen during the automatic steering. According to this, it is possible to grasp the driving situation during the automatic steering on the guidance screen.

The working vehicle 1 is provided on the vehicle body 3, and a position detector device 40 to detect the position of the vehicle body 3 based on a signal from a positioning satellite, and a correction to instruct correction of the position of the vehicle body 3 detected by the position detector device 40. The display device 45 includes a switch 53, a corrected vehicle body position that is the position of the vehicle body 3 corrected by operating the correction switch 53, and an automatic steering mechanism 37 that automatically steers the vehicle body 3 based on the scheduled traveling line L2. The amount of correction of the position of the vehicle body 3 by the correction switch 53 is displayed on the guidance screen. According to this, it is possible to perform automatic steering while displaying the guidance screen.

In the above-described preferred embodiment, when the vehicle body 3 is automatically steered based on the corrected vehicle body position detected by the position detector device 40 and the calculated vehicle body position, the vehicle body 3 is corrected by the correction switch 53 to correct the arithmetic vehicle body position. That is, the correction switch 53 functions as a steering switch that steers the vehicle body 3 separately from the steering handle 30. That is, the working vehicle 1 includes a steering switch. In the description of the steering switch, the correction switch 53 in the above-described preferred embodiment may be considered as the steering switch 53, and the description of the steering switch is omitted. The first corrector portion 53A may be considered as the first steering unit and the second corrector portion 53B may be considered as the second steering unit, and the description of the first steering unit and the second steering unit will be omitted.

That is, the working vehicle 1 is provided with a vehicle body 3 that can travel, a steering handle 30 that steers the vehicle body 3 by rotating, and a steering switch that steers the vehicle body 3 separately from the steering handle 30. Thus, the driver can steer the working vehicle 1 only by operating the steering switch without operating the steering wheel 30.

The steering switch is a switch that steers the vehicle body 3 by pressing or sliding. According to this, the driver can easily steer the vehicle body 3 by performing either an operation of pressing the steering switch or an operation of sliding.

The steering switch is provided around the steering handle 30. According to this, the driver can quickly change from the operation of the steering wheel 30 to the steering by the steering switch. In other words, the driver can travel the working vehicle 1 while easily using both steering by the steering wheel 30 and steering by the steering switch. The working vehicle 1 includes a steering shaft 31 that rotatably supports the steering handle 30, and the steering switch is provided around the steering handle 30. According to this, the driver can quickly change from operating the steering wheel 30 to steering with the steering switch.

The steering switch includes a first steering portion that steers the vehicle body 3 to one side and a second steering portion that steers the vehicle body 3 to the other side. Thus, the driver can steer the vehicle body 3 to one side by operating the first steering portion by pressing or sliding, and can operate the second steering portion by pressing or sliding, thereby the vehicle body 3 can be steered to the other.

The working vehicle 1 is provided on the vehicle body 3 and detects the position of the vehicle body 3 based on a signal from a positioning satellite. An automatic steering mechanism 37 to automatically steer, and the steering switch commands a correction of the position of the vehicle body 3 detected by the position detector device 40 when a pressing or sliding operation is performed, and in the automatic steering mechanism, the vehicle body 3 is automatically steered based on a corrected vehicle body position, which is the position of the vehicle body 3 corrected by pressing a steering switch or operating a slide, and a scheduled traveling line. According to this, when the automatic steering is being performed by the automatic steering mechanism, the steering direction at the time of automatic steering can be easily changed by steering the steering switch.

Figure 19:
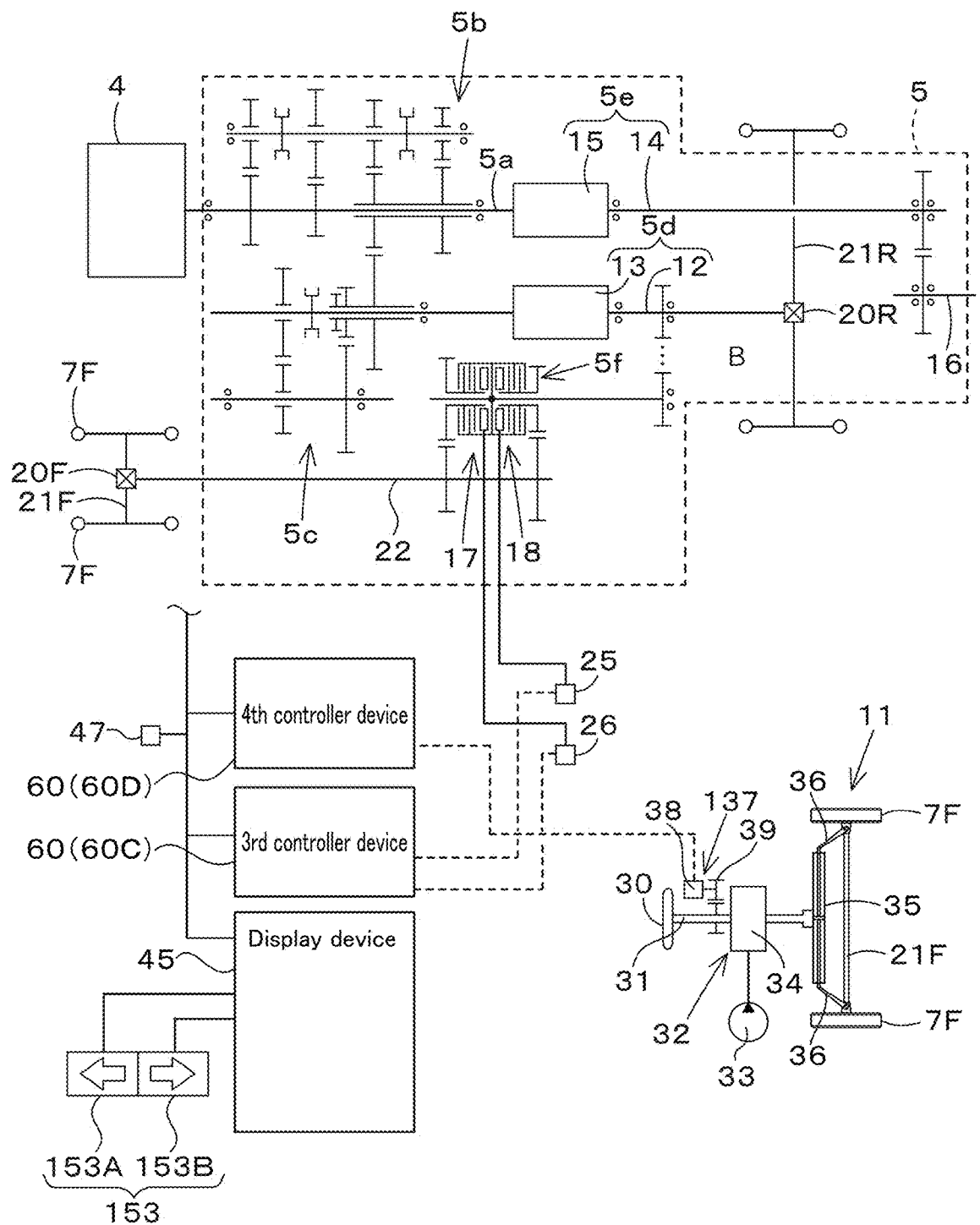
FIG. 19 is a view illustrating a control block diagram of a modified example of a working vehicle including a steering switch according to a preferred embodiment of the present invention.

FIG. 19 is a diagram showing a control block diagram in a modified example of the working vehicle including the steering switch. Note that the description of the configuration similar to that of the above-described preferred embodiment in FIG. 19 will not be repeated.

The tractor 1 is provided with a steering switch 153. The steering switch 153 includes a push switch that can be pressed or a slide switch that can slide. The case where the steering switch 153 is a push switch or a slide switch will be described below.

When the steering switch 153 is a push switch, the steering amount is set based on the number of times the push switch is operated. The steering amount is determined by the steering amount=the number of operations×the amount of steering per one operation. When the steering switch 153 is a slide switch, the steering amount is set based on the operation amount (displacement amount) of the slide switch. For example, the steering amount is determined by the steering amount=the displacement amount from the predetermined position. In addition, the method of increasing the steering amount and the rate of increase are not limited to the above-described numerical values.

The steering switch 153 has a first steering portion 153A and a second steering portion 153B. The first steering portion 153A is a portion that sets steering on one side in the width direction of the vehicle body 3, that is, on the left side. The second steering portion 153B is a portion that sets steering on the other side in the width direction of the vehicle body 3, that is, on the right side.

When the steering switch 153 is a push switch, the first steering unit 153A and the second steering unit 153B are ON or OFF switches that automatically return each time an operation is performed. The switch of the first steering unit 153A and the switch of the second steering unit 153B are integrated. The switch of the first steering unit 153A and the switch of the second steering unit 153B may be arranged separately from each other. Each time the first steering portion 153A is pressed, the steering amount (left steering amount) corresponding to the left side of the vehicle body 3 increases. In addition, each time the second steering portion 153B is pressed, the steering amount (right steering amount) corresponding to the right side of the vehicle body 3 increases.

When the steering switch 153 is a slide switch, the first steering portion 153A and the second steering portion 153B include a knob portion that moves left or right along the longitudinal direction of the elongated hole. When the steering switch 153 is a slide switch, the first steering portion 153A and the second steering portion 153B are arranged apart from each other in the width direction. When the knob is gradually displaced from the predetermined reference position to the left, the left steering amount increases in accordance with the displacement amount. In addition, when the knob portion is gradually displaced rightward from the predetermined reference position, the right steering amount increases in accordance with the displacement amount. In the case of a slide switch, the first steering portion 153A and the second steering portion 153B are integrally formed, the reference position of the knob portion is set to the central portion, and the left steering wheel is moved when moving from the reference position to the left. The amount may be set, and the right steering amount may be set when the knob is moved from the intermediate position to the right.

The tractor 1 is a mechanism in which the steering mechanism 137 rotates (turns) the steering shaft 31 based on the steering of the steering switch 153. The steering mechanism 137 includes a steering motor 38 and a gear mechanism 39. The steering motor 38 and the gear mechanism 39 are the same as those in the above-described preferred embodiments.

Provided with a fourth control device 60D. The fourth control device 60D controls the steering motor 38 based on the operation of the steering switch 153. When the first steering unit 153A is operated, the fourth control device 60D sets the rotation amount (rotational angle) of the steering shaft 31 in accordance with the left steering amount set by the first steering unit 153A. The rotation shaft of the steering motor 38 is rotated so that the steering direction of the tractor 1 is leftward. When the second steering unit 153B is operated, the fourth control device 60D sets the rotation amount (rotational angle) of the steering shaft 31 in accordance with the right steering amount set by the second steering unit 153B. The rotation shaft of the steering motor 38 is rotated so that the steering direction of the tractor 1 is rightward. Thus, by operating the steering switch 153, the tractor 1 can be steered to the left or right. In the modified example described above, the steering motor 138 is rotated by the steering mechanism 137, but instead of this, the control valve 34 is configured by a control valve with a solenoid valve or the like capable of setting the movement amount of the spool, the fourth control device 60D may steer the tractor 1 by controlling the switching position and the opening degree of the control valve 34 according to the left steering amount or the right steering amount.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
    a steering handle;
    a vehicle body to travel by manual steering via the steering handle or automatic steering for the steering handle based on a scheduled traveling line;
    a setting switch to switch, between valid and invalid, a setting mode to set at least the automatic steering before the automatic steering is started;
    a display including a driving display portion to display driving information of the vehicle body during traveling and an icon display portion to display a plurality of settings related to traveling of the vehicle body;
    a position detector lrovided to the vehicle body and configured to detect a position of the vehicle body based on a signal of a positioning satellite; and
    a correction switch to correct the position of the vehicle body detected by the position detector; wherein
    when the setting mode is switched to be valid, the display changes a displaying state of the driving display portion to another displaying state different from the displaying state where the setting mode is invalid;
    the driving display portion includes:
        a correction display portion to dispiay, as the driving information, a correction amount of the correction switch to the position of the vehicle body; and
        the display displays the correction display portion when the setting mode is switched to be valid; and
    the correction display portion displays, as the correction amount, a number of operations of the correction switch.

2. The working vehicle according to claim 1, further comprising:
    a prime mover; wherein
    the driving display portion includes:
    a revolving display portion to display, as the driving information, a revolving speed of the prime mover; and
    when the setting mode is switched to be valid, the display changes a color of the revolving display portion to another color different from the color when the setting mode is invalid.

3. The working vehicle according to claim 2, wherein the revolving display portion includes:
    a level display portion to stepwise display the revolving speed of the prime mover; and
    a numeric display portion to display the revolving speed of the prime mover in a numeric number.

4. The working vehicle according to claim 1, wherein the correction display portion stepwise displays a magnitude of the correction amount.

5. The working vehicle according to claim 1, wherein the correction display portion includes:
    a first correction display portion to display the correction amount to the position of the vehicle body on one side of the vehicle body in a width direction of the vehicle body; and
    a second correction display portion to display the correction amount to the position of the vehicle body on the other side of the vehicle body in a width direction of the vehicle body.

* * * * *